(12) United States Patent
Purtle et al.

(10) Patent No.: US 11,006,618 B2
(45) Date of Patent: *May 18, 2021

(54) REDUCED WEIGHT LIVE POULTRY HAULING SYSTEM

(71) Applicant: W.A. Crider, Jr., Stillmore, GA (US)

(72) Inventors: David S. Purtle, Braselton, GA (US); Miles A. Reitnouer, Leesport, PA (US)

(73) Assignee: W. A. Crider, Jr., Stillmore, GA (US)

( * ) Notice: Subject to any disclaimer, the term of this patent is extended or adjusted under 35 U.S.C. 154(b) by 184 days.

This patent is subject to a terminal disclaimer.

(21) Appl. No.: 16/430,603

(22) Filed: Jun. 4, 2019

(65) Prior Publication Data
US 2019/0281795 A1 Sep. 19, 2019

Related U.S. Application Data

(60) Division of application No. 16/129,137, filed on Sep. 12, 2018, now Pat. No. 10,349,636, which is a continuation of application No. 15/884,819, filed on Jan. 31, 2018, now Pat. No. 10,085,428, which is a continuation of application No. 15/689,087, filed on Aug. 29, 2017, now Pat. No. 9,918,456, which is a continuation of application No. 15/581,043, filed on Apr. 28, 2017, now Pat. No. 9,788,532, which is a division of application No. 15/206,769, filed on Jul. 11, 2016, now Pat. No. 9,668,460, which is a division of application No. 14/207,804, filed on Mar. 13, 2014, now Pat. No. 9,420,767.

(60) Provisional application No. 61/861,534, filed on Aug. 2, 2013, provisional application No. 61/788,916, filed on Mar. 15, 2013.

(51) Int. Cl.
*A01K 45/00* (2006.01)
*A01K 31/00* (2006.01)
*B60P 3/04* (2006.01)

(52) U.S. Cl.
CPC ............ *A01K 45/00* (2013.01); *A01K 31/002* (2013.01); *A01K 45/005* (2013.01); *B60P 3/04* (2013.01); *Y10T 29/4984* (2015.01)

(58) Field of Classification Search
CPC .... A01K 45/00; A01K 45/005; A01K 31/002; A01K 31/07; B60P 3/04; B61D 3/163
See application file for complete search history.

(56) References Cited

U.S. PATENT DOCUMENTS 1,694,732 A 12/1928 Cohen
3,476,084 A 11/1969 Nater et al.
(Continued)

OTHER PUBLICATIONS

International Search Report for PCT Application No. PCT/US2014/025288 dated Aug. 1, 2014.

*Primary Examiner* — Trinh T Nguyen
(74) *Attorney, Agent, or Firm* — Caesar Rivise, PC

(57) ABSTRACT

A reduced-weight poultry cage is used in conjunction with a reduced-weight trailer to transport live poultry for maximizing the poundage of poultry being transported while reducing the number of trips and fuel expenses. The poultry cage includes a combination of aluminum and plastic elements that reduce cage weight, provide for nesting of cages in stacks as well as easy replacement of failed parts. Furthermore, a drop-deck aluminum trailer with a reduced floor and guide rail alignment stops allows for a durable yet lightweight trailer that can haul a plurality of stacks of these poultry cages, thereby maximizing cubic feet availability while being compliant with various road and bridge laws.

12 Claims, 25 Drawing Sheets

(56) References Cited

U.S. PATENT DOCUMENTS

| | | | |
|---|---|---|---|
| 3,621,818 | A | 11/1971 | Johnston et al. |
| 3,754,676 | A | 8/1973 | Box |
| 3,796,457 | A | 3/1974 | Hinchliff |
| 3,895,727 | A | 7/1975 | Rucker |
| 3,952,703 | A | 4/1976 | Erfeling |
| 4,084,714 | A | 4/1978 | Williams |
| 4,285,299 | A | 8/1981 | Thomas |
| 5,192,176 | A | 3/1993 | Roberts |
| 5,242,185 | A | 9/1993 | Carr et al. |
| 5,596,950 | A | 1/1997 | Briggs et al. |
| 5,613,726 | A | 3/1997 | Hobbs et al. |
| 5,913,286 | A | 6/1999 | Showalter |
| 6,655,897 | B1 | 12/2003 | Harwell |
| 6,817,316 | B1 | 11/2004 | Roussy |
| 7,389,745 | B2 | 6/2008 | Weaver |
| 7,510,233 | B2 | 3/2009 | Bowling |
| 8,020,517 | B2 | 9/2011 | Seay |
| 2005/0166859 | A1 | 8/2005 | Weaver |
| 2008/0193247 | A1 | 8/2008 | Zupancich et al. |
| 2008/0236508 | A1 | 10/2008 | Seay |
| 2009/0243244 | A1 | 10/2009 | Richardson et al. |
| 2012/0305434 | A1 | 12/2012 | Nolet et al. |
| 2013/0074777 | A1 | 3/2013 | Smith et al. |

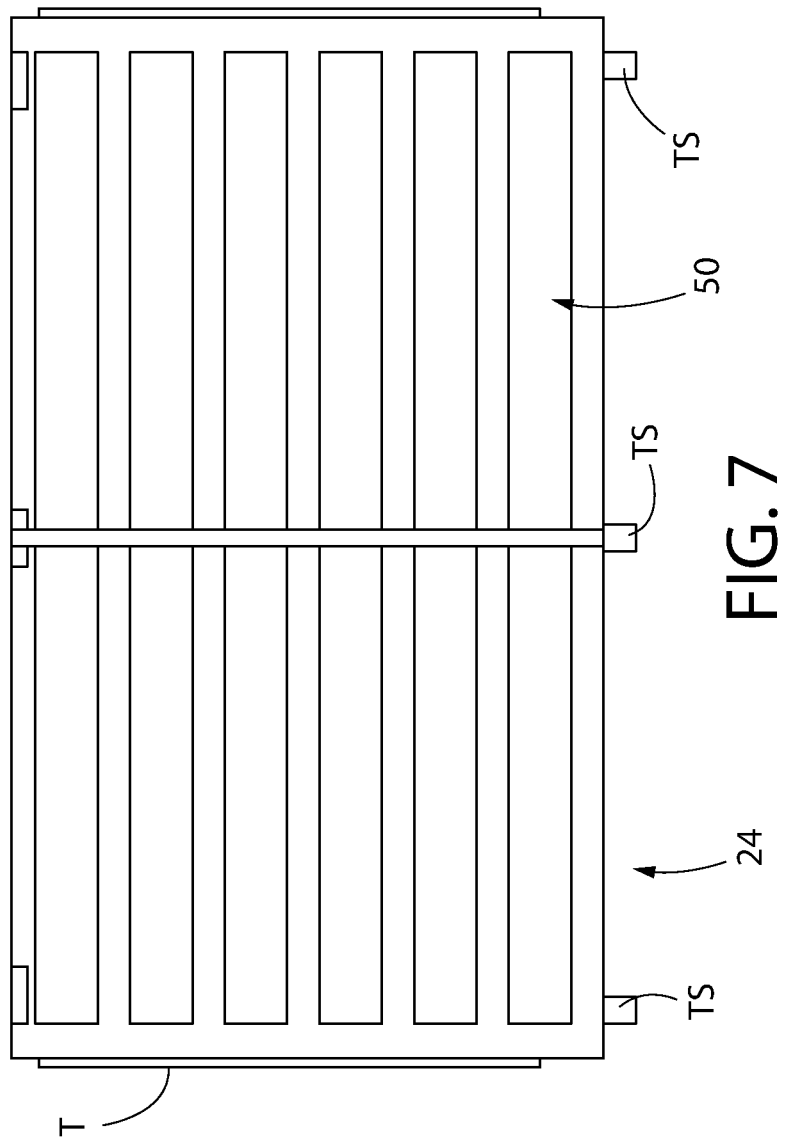

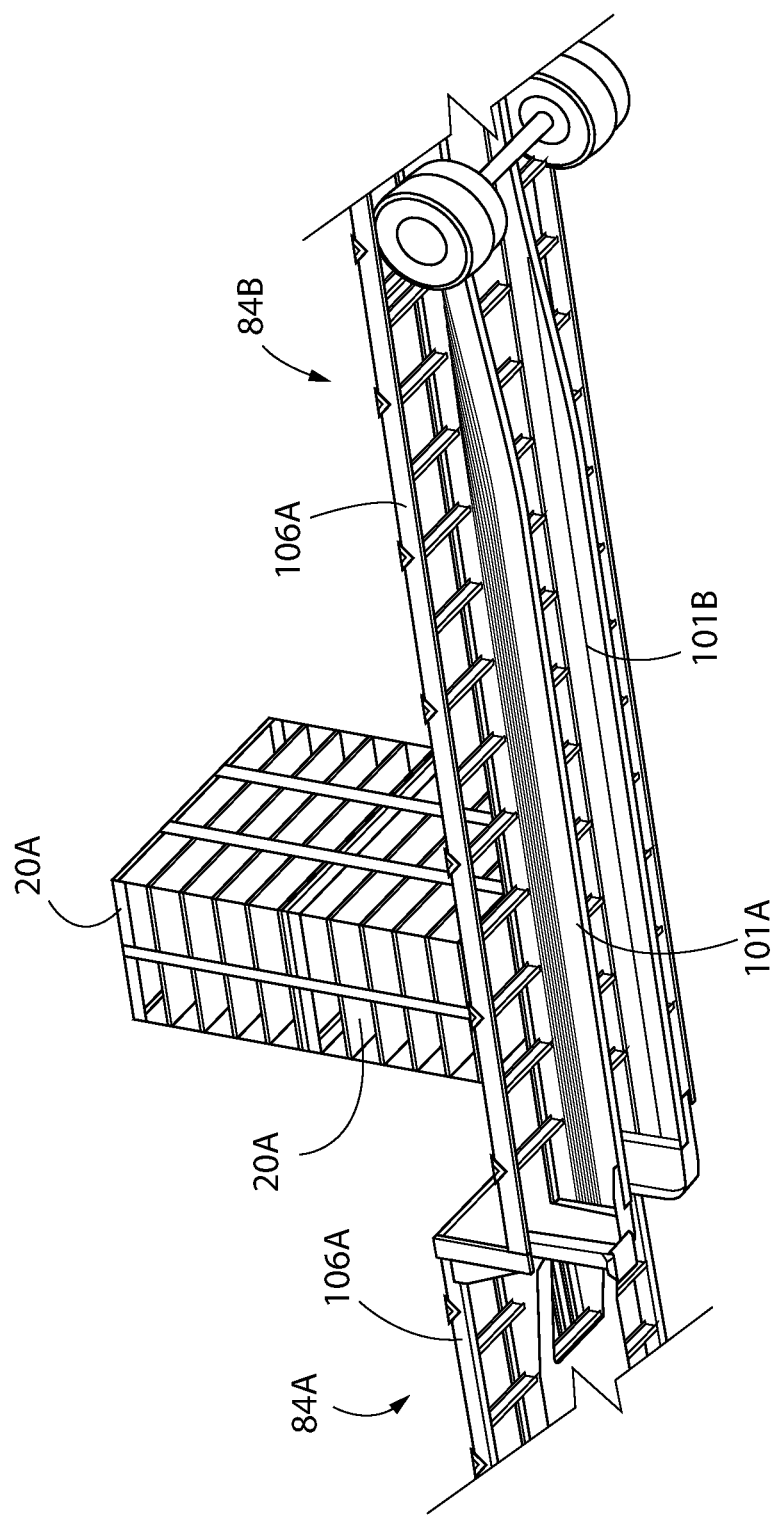

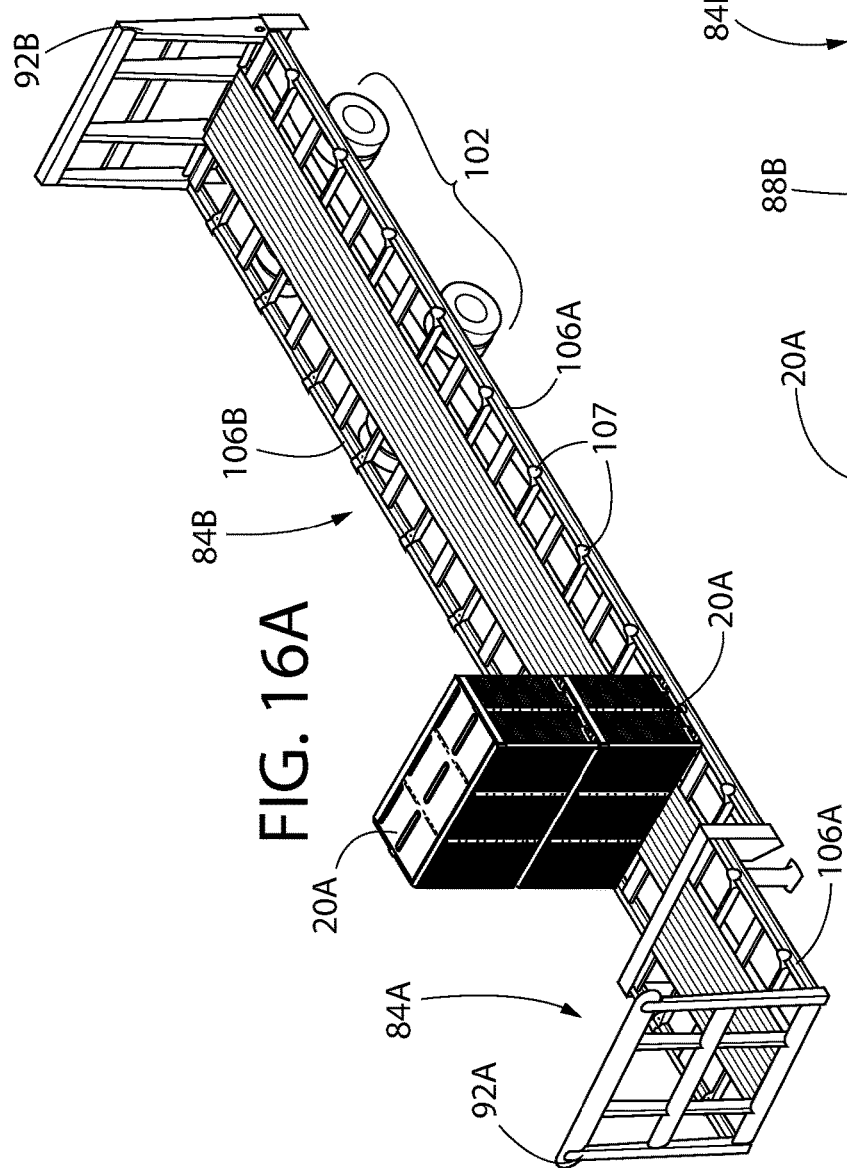
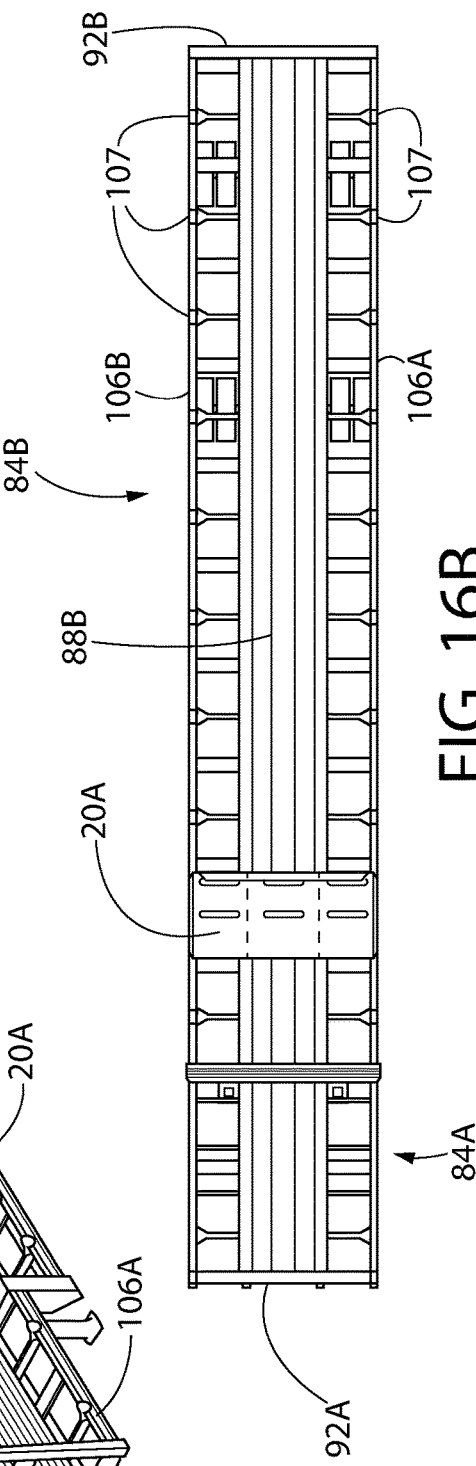

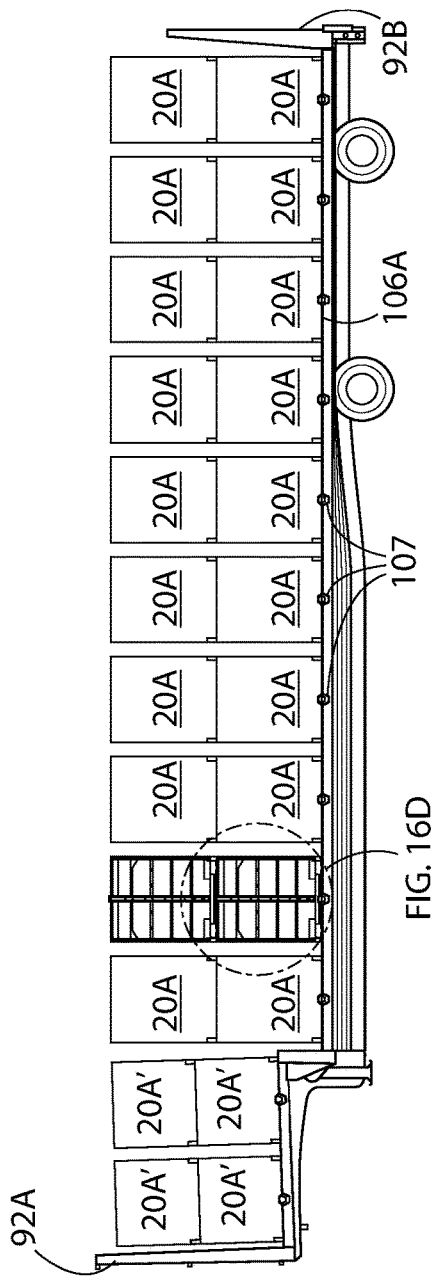
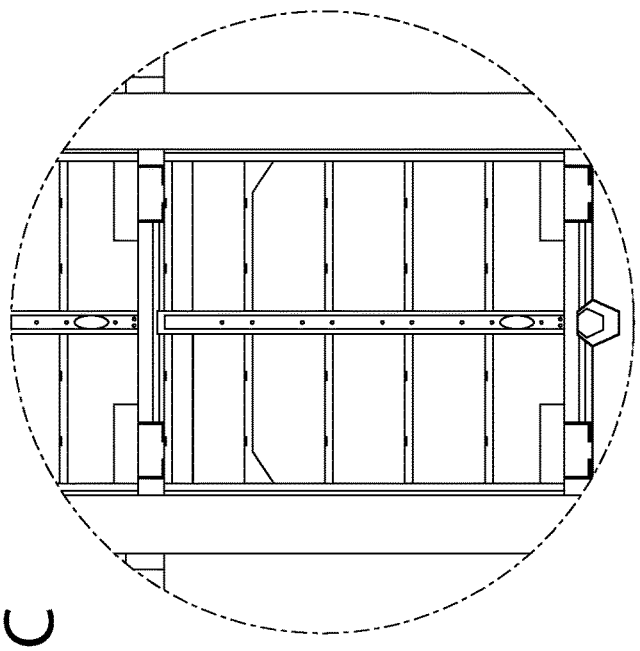
FIG. 16C
FIG. 16D

REDUCED WEIGHT LIVE POULTRY HAULING SYSTEM

CROSS-REFERENCE TO RELATED APPLICATIONS

This divisional application claims the benefit under 35 U.S.C. § 121 of application Ser. No. 16/129,137 filed on Sep. 12, 2018 entitled "Reduced Weight Live Poultry Hauling System" which in turn is a continuation application that claims the benefit under 35 U.S.C. § 120 of application Ser. No. 15/884,819 (now U.S. Pat. No. 10,085,428) filed on Jan. 31, 2018 entitled "Reduced Weight Live Poultry Hauling System which in turn is a continuation application that claims the benefit under 35 U.S.C. § 120 of application Ser. No. 15/689,087 (now U.S. Pat. No. 9,918,456) filed on Aug. 29, 2017 entitled "Reduced Weight Live Poultry Hauling System", which in turn is a continuation application that claims the benefit under 35 U.S.C. § 120 of application Ser. No. 15/581,043 (now U.S. Pat. No. 9,788,532) filed on Apr. 28, 2017 entitled "Reduced Weight Live Poultry Hauling System" which is a divisional application that claims the benefit under 35 U.S.C. § 121 of application Ser. No. 15/206,769 (now U.S. Pat. No. 9,668,460) filed on Jul. 11, 2016 entitled "Reduced Weight Live Poultry Hauling System" which is a divisional application that claims the benefit under 35 U.S.C. § 121 of application Ser. No. 14/207,804 (now U.S. Pat. No. 9,420,767) filed on Mar. 13, 2014 also entitled "Reduced Weight Live Poultry Hauling System" which in turn claims the benefit under 35 U.S.C. § 119(e) of both Application Ser. No. 61/788,916 filed on Mar. 15, 2013 entitled "Reduced Weight Live Poultry Hauling System" and Application Ser. No. 61/861,534 filed on Aug. 2, 2013 entitled "Integrated System for Transporting Live Poultry," and all of whose entire disclosures are incorporated by reference herein.

BACKGROUND OF THE INVENTION

The present invention relates to relates generally to techniques for transporting live poultry.

The U.S. Poultry industry grows their chickens in large houses or barns until the chickens reach market age and then transport the live birds to a slaughter plant by the means of cages on a flatbed trailer. Typical poultry cages are designed to be handled with fork lifts and dumped mechanically at the slaughter plant. The current system of transportation evolved over approximately years ago and has changed very little over time. One of the problems with the current system is the tractor, trailer, cages and binding mechanism weigh approximately 48,000 pounds empty allowing a payload of only 31,000 pounds of live chickens.

Currently, the industry standard for transporting live poultry is a steel cage with two forklift sleeves separated with angle stretchers to form a rectangular base for the cage. The steel cage is constructed of square tubular posts, which are welded to each side of a base to segment the frame into compartment stacks. Horizontal square tubing is then positioned between the vertical post both longitudinal and transverse to provide support beams for the compartment floors. Additionally, a single sheet of fiberglass or un-reinforced plastic is positioned on the horizontal beams, which provide flooring for the compartments on each level. The cage roof is constructed from a single panel of galvanized sheet metal welded to the square tubing frame located around the perimeter of the top of the compartments.

Birds are retained in the individual compartments by wall panels constructed from small vertical wires secured by larger horizontal wires welded at crossing tangents at the top, bottom, and midpoint of the panels to form a grid. The frame panels are welded to the inside of the structural tubular frame. Frequent damage occurs when the forklift tines impact the wire grid panel and broken wires can be pushed inward causing injury to the birds until the panels are repaired. Typically, the panels are not repaired or replaced unless the birds are able to leave the cage through the damaged opening. Moreover, repairing such cages is difficult.

The door panels are extruded aluminum with round solid tubular like profiles incorporated in the top and bottom of the profile and extending longitudinally from one extremity to the other. The position of the door is controlled by a spring loaded mechanism, which consist of a bracket rigidly mounted to the door's far side extremity, to which is rotationally mounted a rod. The rotationally mounted rod protrudes through a slot in a bracket rigidly mounted to the inside face of one of the cage's adjacent tubular post. A spring is circumferentially positioned around the control rod and placed between the door bracket and the cage mounted bracket. The spring is mounted so the spring is loaded at the midpoint of the door's rotation and is relaxed as the pivot goes over center to close or open the door.

When accidentally struck by forklift tines, the aluminum door stays permanently bent. The bend in the door causes the mounting pin to jam in the receiving post and the control rod in its mounting. This causes the door to be fixed in the partially open position. The partially open doors are frequently torn loose during the close side-by-side loading on the transport trailer or unloading system. It is common practice to remove the door if repair is extensive and leave the compartment without a door and therefore an un-productive compartment.

Currently, metal cages weigh in excess of 900 pounds per cage. A truck carrying a normal load of 22 empty cages would include approximately nine tons of metal cages. The weight of the metal cages adds significantly to the transportation fuel cost for shipping poultry. Additionally transportation costs associated with shipping the empty metal cages are incurred with each poultry shipment because the poultry is typically only transported one way.

One solution to this problem is disclosed in U.S. Pat. No. 8,020,517 (Seay), which is owned by the same Assignee, namely, W. A. Crider, Jr., as the present application. In that invention, a plurality of stand-alone poultry cages are formed of plastic and then stacked inside a welded-together aluminum frame. Unfortunately, that invention suffers from several problems, including poor structural stability as well as cracking of the frame.

Thus, there remains a need for a poultry cage-trailer combination that together greatly reduces the weight of those components in order to maximize payload, i.e., live bird pounds, that combines good structural stability with durability and while complying with road and bridge laws.

All references cited herein are incorporated herein by reference in their entireties.

BRIEF SUMMARY OF THE INVENTION

A reduced weight poultry cage is disclosed. The cage comprises: an aluminum frame formed by a plurality of vertical members coupled to a base and each vertical member comprising a stack of floor supports; a plurality of aluminum flooring layers, each of the aluminum flooring layers being supported on a corresponding set of floor supports at a common elevation; a plurality of polymer panels that are coupled between adjacent or opposite floor supports at a common elevation on a corresponding floor layer to form a plurality of poultry compartments; and a respective compartment door positioned at one side of each poultry compartment on a common side of the cage.

A method of forming a reduced weight poultry cage is disclosed. The method comprises: (a) forming an aluminum frame using a plurality of vertical members coupled to a base; (b) securing a floor support to each one of said vertical members; (c) positioning an aluminum flooring layer on top of said floor supports; (d) positioning a plurality of polymer panels between adjacent floor supports and across oppositely-facing floor supports to form a plurality of poultry compartments on said aluminum flooring layer; (e) repeating steps (b)-(d) at least once to form at least a second plurality of poultry compartments; and (f) releasably securing a respective door to each one of said plurality of poultry compartments on a common side of said frame.

A trailer for conveying live poultry in cages and optimized to maximize payload while minimizing trailer weight is disclosed. The trailer comprises: a plurality of aluminum main beams arranged longitudinally along the length of the trailer; a pair of aluminum guide rails that run the length of the trailer, forming a respective side of the trailer, and coupled together via a plurality of aluminum cross members arranged transversely for connecting the guide rails together to form a frame structure that is secured to the plurality of main beams, and wherein the guide rails support at least one cage thereon and are adapted to engage a portion of the cage therein; a suspension assembly located at a rear portion of the trailer for supporting the frame structure and the plurality of aluminum main beams upon a plurality of wheel axle assemblies; and a floor secured only to a middle region of the frame structure along the length of the trailer.

A method for conveying live poultry in cages via trailer which is optimized to maximize payload while minimizing trailer weight is disclosed. The method comprises: providing a plurality of aluminum main beams arranged longitudinally along the length of the trailer; providing a pair of aluminum guide rails that run the length of the trailer to form a respective side of the trailer; coupling the aluminum guide rails together using a plurality of aluminum cross members arranged transversely for connecting the guide rails together to form a frame structure that is secured to the plurality of main beams; positioning a plurality of cage guide stops along the length of each of the guide rails for engaging portions of the cages; providing a suspension assembly located at a rear portion of the trailer for supporting the frame structure and the plurality of aluminum main beams upon a plurality of wheel axle assemblies; omitting a floor on the trailer except for a middle region of the frame structure along the length of the trailer; and positioning at least one cage on the guide rails so that portions of the at least one cage engage respective ones of the cage guide stops.

An integrated system for conveying live poultry in cages on a trailer and optimized to maximize payload while minimizing cage and trailer weight is disclosed. The system comprises: a reduced weight poultry cage comprising: an aluminum frame formed by a plurality of vertical members coupled to a base and each vertical member comprising a stack of floor supports; a plurality of aluminum flooring layers, wherein each of the aluminum flooring layers is supported on a corresponding set of floor supports at a common elevation; a plurality of polymer panels that are coupled between adjacent or opposite floor supports at a common elevation on a corresponding floor layer to form a plurality of poultry compartments; and a respective compartment door positioned at one side of each poultry compartment on a common side of the cage; and a reduced weight trailer for hauling at least one of the reduced weight poultry cages, wherein the trailer comprises: a plurality of aluminum main beams arranged longitudinally along the length of the trailer; a frame structure formed from a pair of aluminum guide rails coupled together via a plurality of aluminum cross members, wherein the frame structure is coupled to the main beams; and a suspension assembly located at a rear portion of the trailer for supporting the frame structure and the plurality of aluminum main beams upon a plurality of wheel axle assemblies.

A method of conveying live poultry in cages on a trailer and optimized to maximize payload while minimizing cage and trailer weight is disclosed. The method comprises: (a) forming an aluminum frame using a plurality of vertical members coupled to a base; (b) securing a floor support to each one of the vertical members; (c) positioning an aluminum flooring layer on top of the floor supports; (d) positioning a plurality of polymer panels between adjacent floor supports and across oppositely-facing floor supports to form a plurality of poultry compartments on the aluminum flooring layer; (e) repeating steps (b)-(d) at least once to form at least a second plurality of poultry compartments; and (f) releasably securing a respective door to each one of the plurality of poultry compartments on a common side of the frame; (g) loading poultry into each one the poultry compartments; (h) forming a reduced weight trailer for carrying at least one reduced weight poultry cage by coupling a frame structure, comprising a pair of aluminum guide rails coupled together by a plurality of aluminum cross members, to a plurality of aluminum main beams arranged longitudinally along the length of the trailer; and (i) coupling a suspension assembly to the main beams located at a rear portion of the trailer for supporting the frame structure and the main beams upon a plurality of wheel axle assemblies; and (j) loading the at least one reduced weight poultry cage containing the poultry onto the trailer.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 7 is a plan view of a side wall panel for a compartment of the poultry cage;

FIG. 15D is a partial underside isometric view of the lightweight trailer showing a one stack cages thereon with no side wall panels, back wall panels or doors shown;

FIG. 16A is an isometric view of the lightweight trailer showing a single stack of cages (e.g., two) secured on the lower deck of the trailer;

FIG. 16B is a plan view of the trailer and single stack of cages of FIG. 16A;

FIG. 16C is a side view of the trailer and single stack of cages of FIG. 16A shown with no side wall panels installed;

FIG. 16D is an enlarged view of the single stack positioned on the trailer of FIG. 16A shown with no side wall panels installed;

DETAILED DESCRIPTION OF THE PREFERRED EMBODIMENTS

Figure 1:
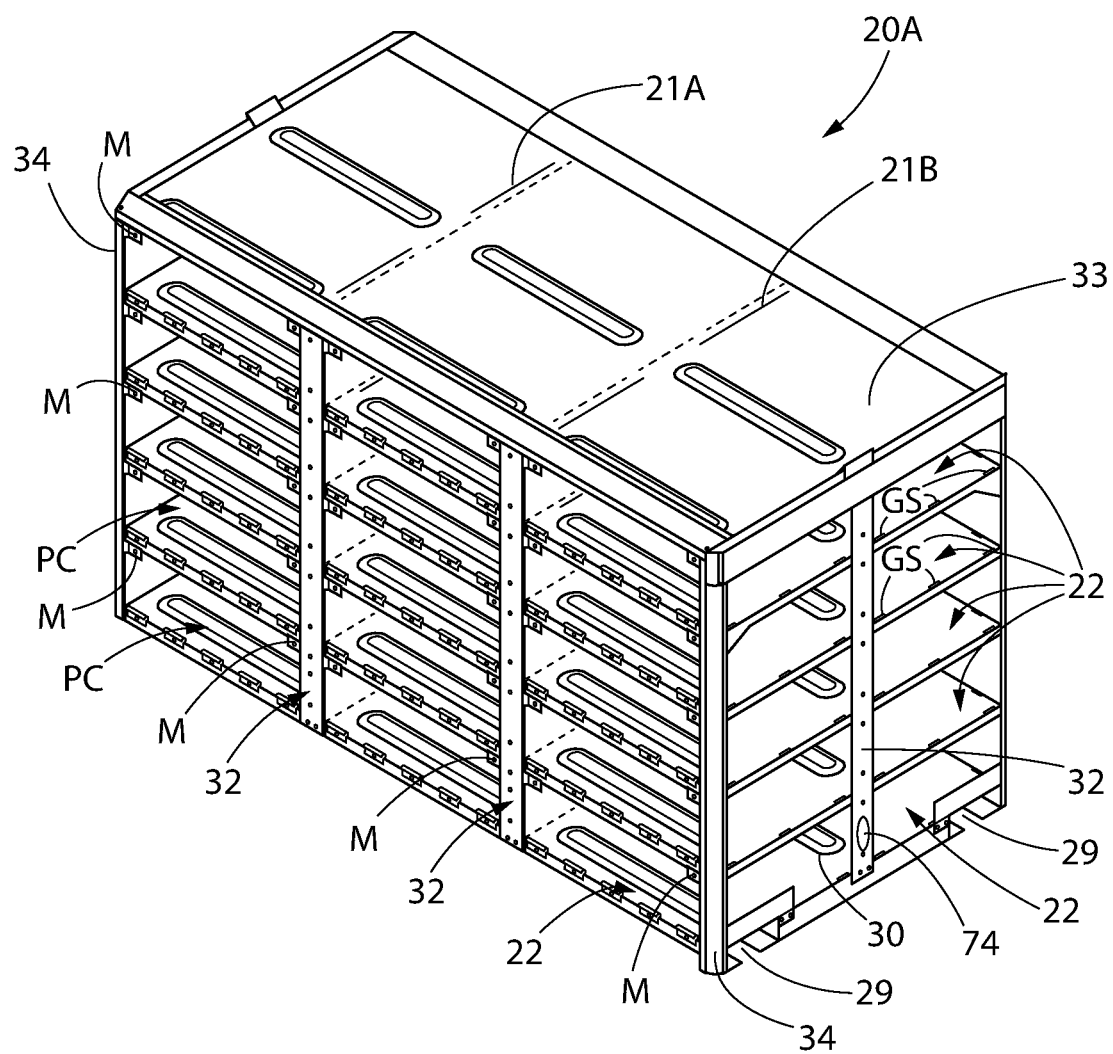
FIG. 1 is a perspective view of the front side of a poultry cage of the present invention showing a plurality of aluminum floors and with none of the doors or side wall panels installed.

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

The present invention overcomes the problems of the prior art by establishing both a reduced weight poultry cage 20A along with a corresponding reduced weight trailer 20B for transporting a plurality of these reduced weight poultry cages 20A thereon.

Reduced Weight Poultry Cage 20A

Figure 4:
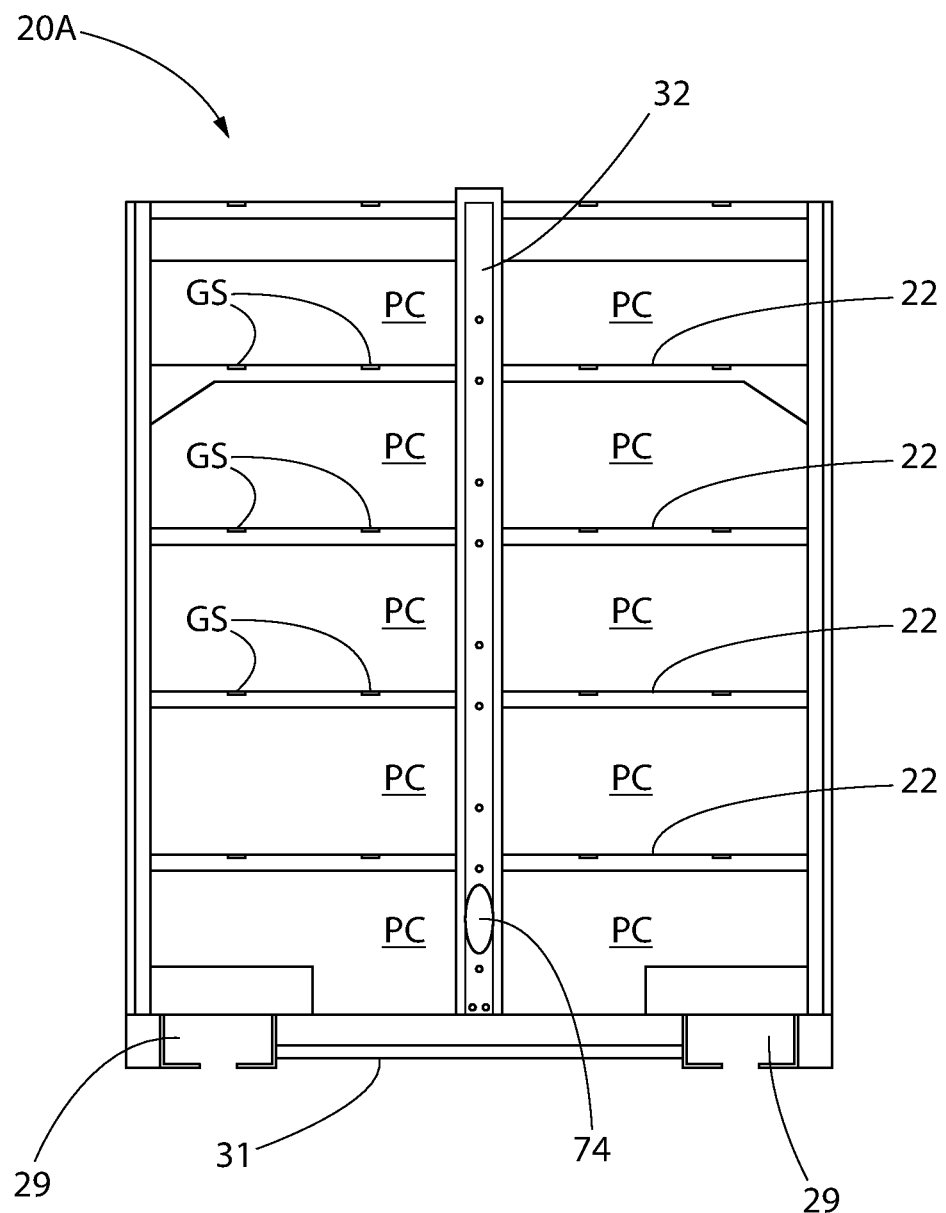
FIG. 4 is a side view of the poultry cage of FIGS. 1 and 2.
Figure 9A:
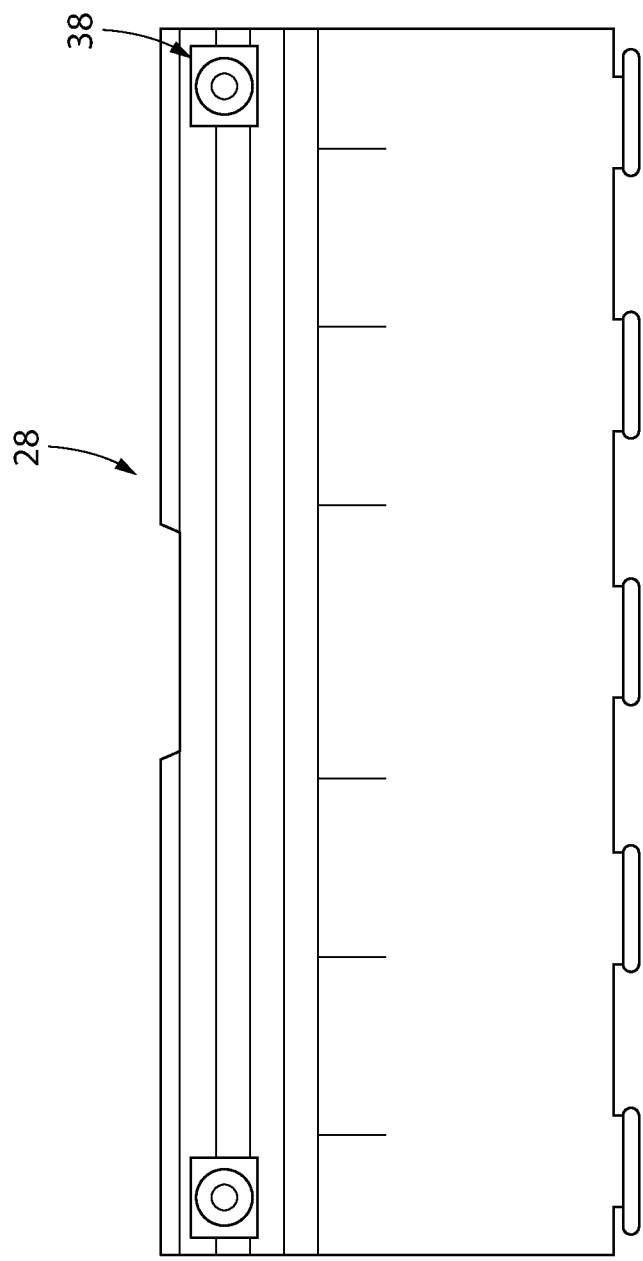
FIG. 9A is a plan view of the inner side of a compartment door showing one example of a door closure mechanism, for example, strikeplates in the upper two corners that are magnetically-coupled by magnets.
Figure 10:
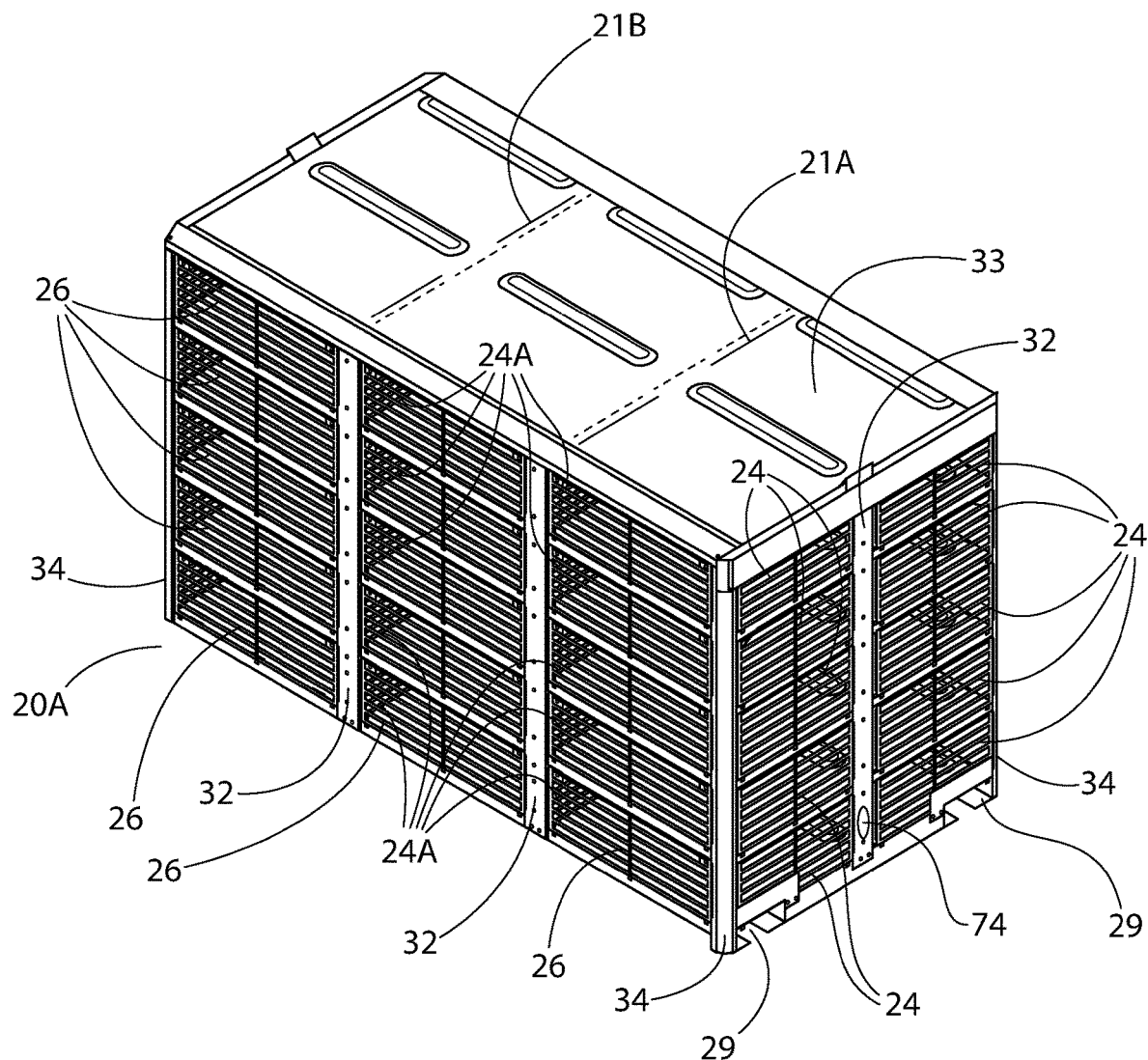
FIG. 10 is a view of one of the back corners of the poultry cage of the present invention showing the side wall panels and the back wall panels installed for all of the compartments.
Figure 11:
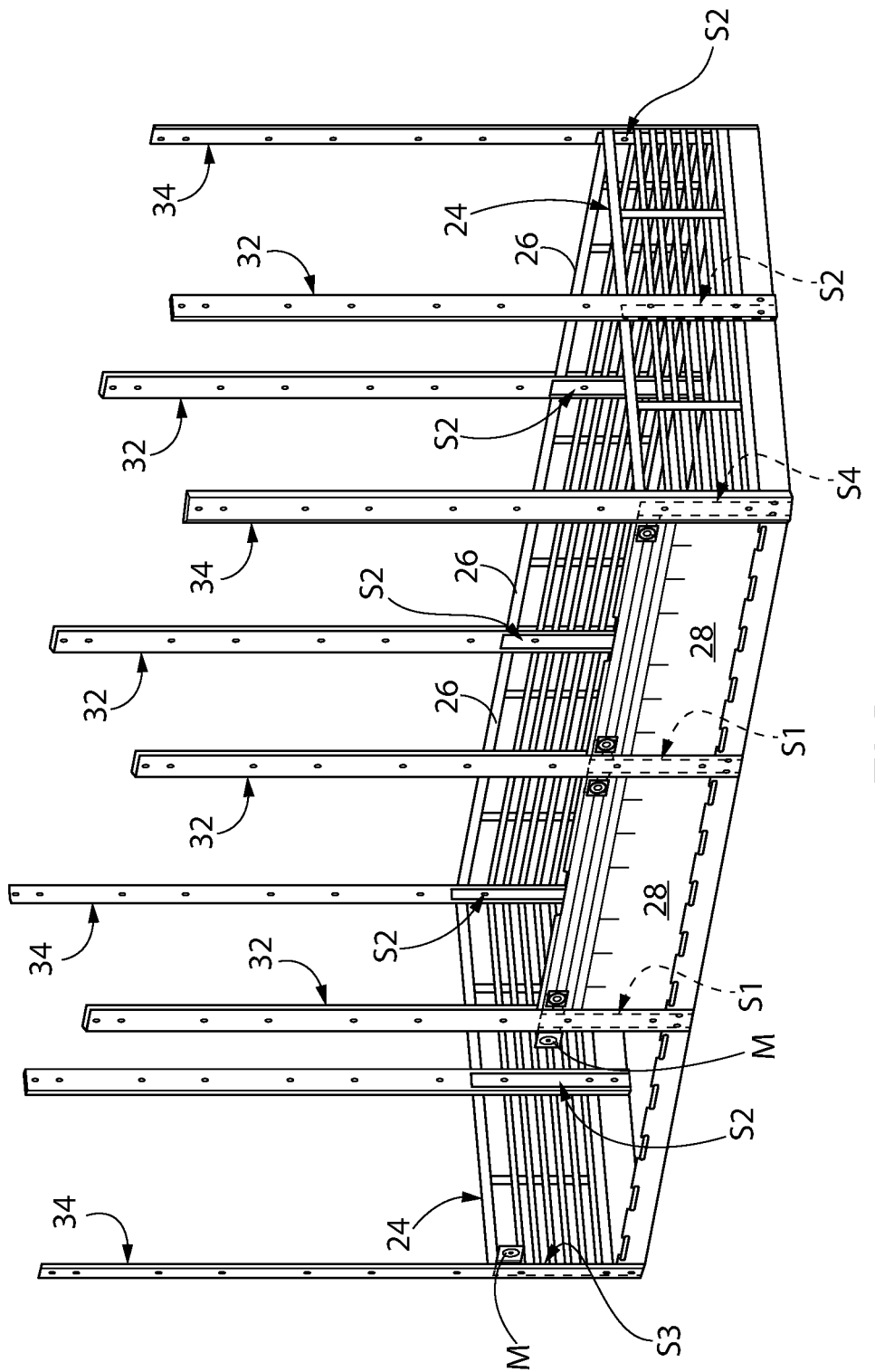
FIG. 11 depicts a partially-assembled poultry cage 20A of the present invention, showing the floor supports secured in their respective vertical struts or corner struts for receiving a floor layer.

The poultry cage 20A of the present invention comprises an outer metal (e.g., aluminum) frame that is formed and stabilized by a plurality of floor layers 12. Compartments (PC) for the poultry are formed on each floor layer 12 by installing side panels 24 (FIG. 7) and back panels 26 (FIG. 8) before the next floor layer 12 is installed. FIG. 11 depicts a back corner of the poultry cage 20A showing the side panels 24 and the back panels 26 installed. By way of example only, the poultry cage 20A consists of three stacks (FIG. 4) ST1-ST3 of five levels; thus, once the side panels 24 and back panels 26 for each floor layer 22 are installed, the poultry cage 20A comprises fifteen compartments for holding poultry. It should be understood that in order to form this number of compartments, side panels 24A (also referred to as "internal wall panels"; see FIG. 10) are also installed between vertical struts 32 (between the front and rear sides of the cage 20A) on each floor layer 22, and aligned with the lines 21A and 21B in FIGS. 1-2. A respective door 28 (FIG. 9A) for each compartment is located along the front side of the cage 20A. As also shown in FIG. 4, forklift tine sleeves 29 are provided for at the base 31 of the poultry cage 20A to permit the poultry cage 20A to be lifted, tilted and/or set down.

Figure 2:
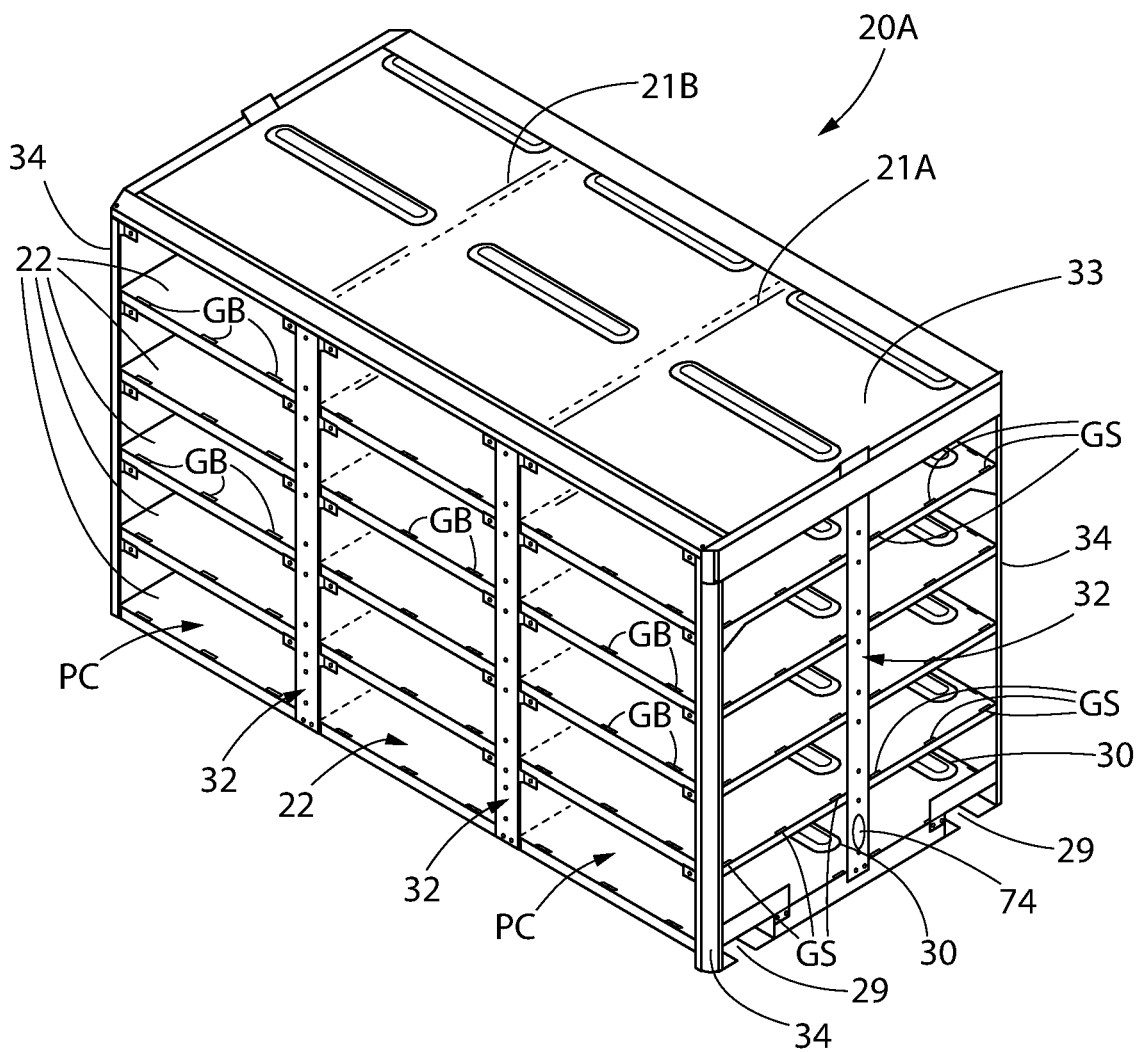
FIG. 2 is a perspective view of the rear side diagram of the poultry cage of FIG. 1 with none of the back walls installed.
Figure 3:
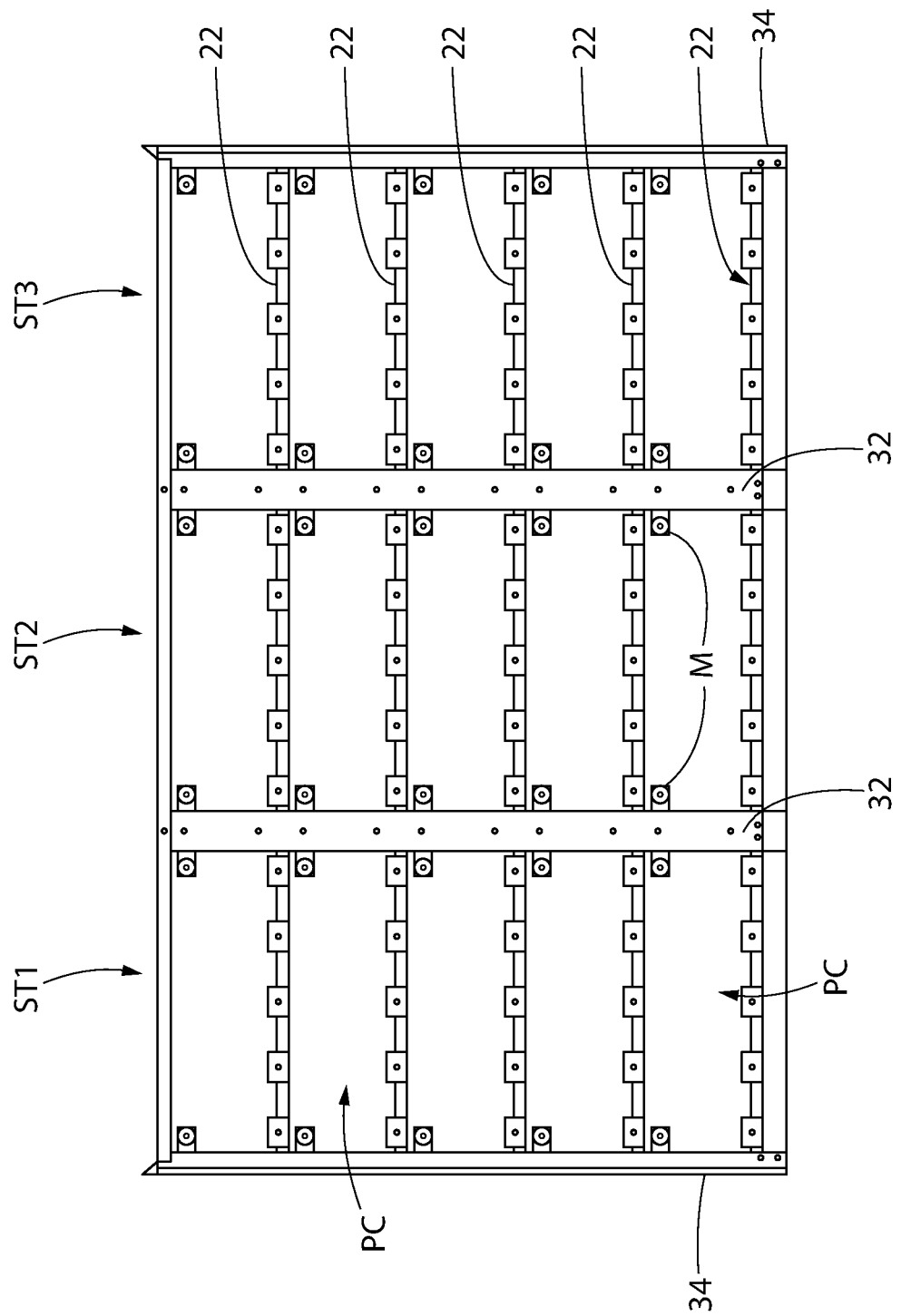
FIG. 3 is a front plan view of the poultry cage of FIGS. 1 and 2.

Each floor panel or layer 22 is formed from a sheet of aluminum that is pressed to form the appropriate shape. It should be understood that the layer 22 is continuous from one cage side to the other cage side and from the front of the cage to the back of the cage. As shown in FIGS. 1-2, each floor panel or layers 22 features ridges or longitudinal ribs 30 that provide enhanced structural integrity to each floor panel 22; however, the ridges 30 are not raised enough for a chicken to grab hold when the cage 20A is tilted on its side for dumping at a processing plant. Accordingly, by way of example only, the poultry cage 20A comprises five support levels of solid one piece aluminum floors 22 that prevent a bird from using its toes to stay in the cage 20A during a dumping process. Also, in an exemplary embodiment, each floor 22 has an open slot (not shown) allowing poultry manure to escape during loading and unloading of the cages 20A.

Figure 5:
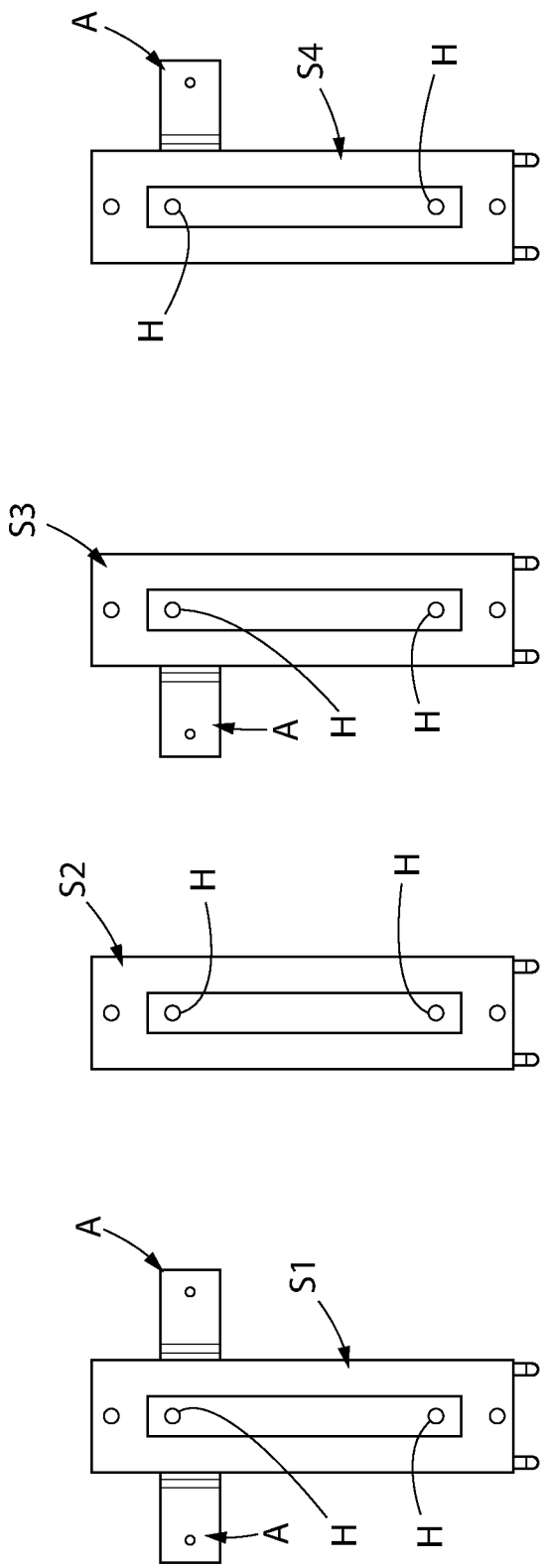
FIG. 5 depicts the different floor support members.

As mentioned previously, the poultry cage 20A comprises an outer metal (e.g., aluminum) frame. This frame is composed of a plurality of vertical struts 32 and corner struts 34 (FIGS. 1-2) that, among other things, act as guideways for a plurality of floor supports (S1, S2, S3 or S4 as shown in FIG. 5) that support each floor layer 22. Each floor support (e.g., aluminum) not only acts as a floor support for a floor layer 22 (as well as spacers between floor layers 22) but the support is also used for connecting the side panels 24, internal wall panels 24A and back panels 26 for each compartment. As also shown in FIG. 5, there are different types of floor supports: S1, S2, S3 and S4. Floor supports S1, S3 and S4 comprise magnet support arms A to which magnets M are secured. Depending on where the floor supports are used, i.e., on the front, sides or back of the poultry cage 20A and whether the floor supports are used in the corners determines which type of floor support is used. For example, floor supports being used at the front of the cage 20A, utilize floor supports S1, while floor supports being used at the left and right front corners use floor supports S3 and S4, respectively, because those floor supports include magnets M for maintaining the doors 28 in a closed condition, as will be discussed later; floor supports used along the sides (FIG. 4) and the back (FIG. 2) of the cage 20A, utilize floor supports S2 since there are no doors 28 for the compartments along the sides and back of the cage 20A. The floor supports S1, S2, S3 and S4 are secured to their respective vertical struts 32 or corner struts 34 via fasteners (for example, see FIG. 11) via holes H (for example, see FIG. 5).

Figure 6A:
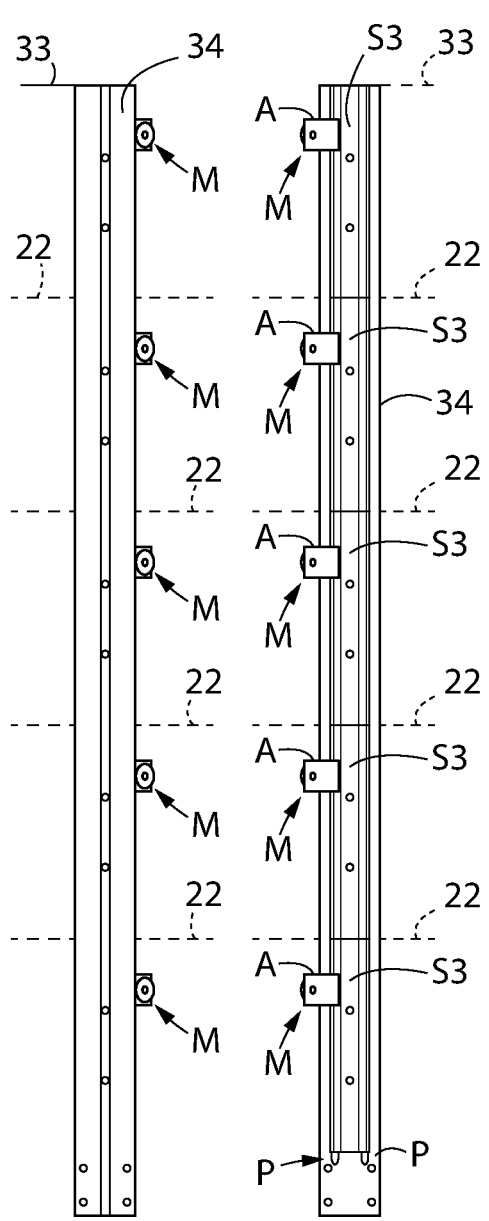
FIG. 6A are front and back views of a front corner strut showing the corresponding floor support members secured thereto and with the various flooring layers shown partially in phantom.
Figure 6B:
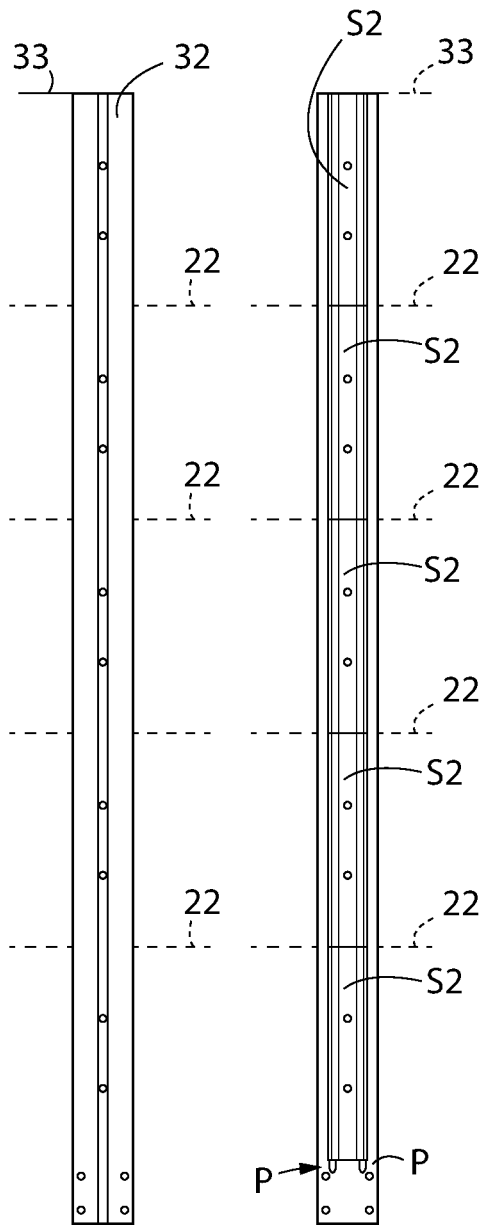
FIG. 6B are front and back views of a vertical strut, for use along the sides or back side of the poultry cage, showing corresponding floor support members secured thereto and with the various flooring layers shown partially in phantom.

FIG. 6A shows a front view and a back view of the corner strut 34 having a "stack" of floor supports S3 secured thereto. This corner strut 34 corresponds to the corner strut 34 shown in FIG. 1 at the left front corner of the cage 20A. The different floor layers 22 that are disposed in between the floor supports S3 are shown in phantom. Correspondingly, in FIG. 6B, there is shown a front view and a back view of the vertical strut 32 having a "stack" of floor supports S2. It should be noted that the vertical strut 32/floor supports S2 assembly (shown with the different floor layers 22 (indicated in phantom) disposed in between the floor supports S2) is positioned at the back, or on the sides, of the poultry cage 20A as shown by the reference numbers 32 in FIG. 2 since, as mentioned previously, no doors 28 are located on the sides or the back of the cage 20A. As can be appreciated from FIGS. 5-6, two plugs P are provided which are inserted through the holes (not shown) of a floor layer 22 and then mated with corresponding holes (not shown) in another floor support positioned below the upper floor support.

Figure 12:
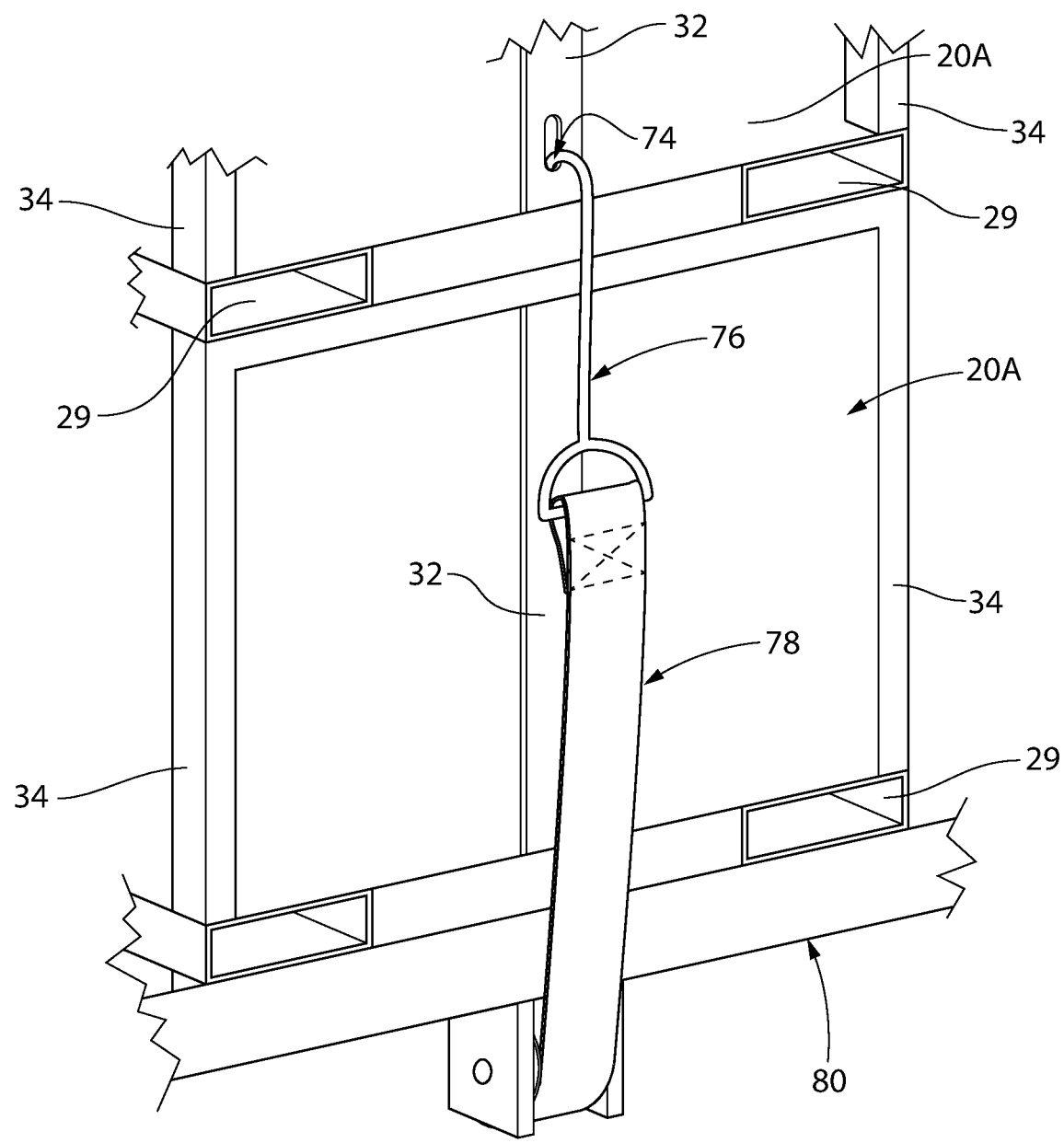
FIG. 12 is a diagram illustrating a less preferred winch system used to arrest movement of the poultry cages in accordance with an exemplary embodiment of the present disclosure.

FIG. 12 depicts a partially-assembled poultry cage 20A of the present invention. As can be seen, floor supports S2 are seen secured to respective vertical struts 32 and to a back corner strut 34 and are awaiting a floor layer 22 to be disposed thereon. The floor supports S1-S4 have a groove or slot formed in extruded aluminum in which a tongue or protrusion T of a polymer component (e.g., sidewall panel 24, internal sidewall panel 24A and back wall panel 26) fits and is able to be slid in position within the cage assembly 20A. Furthermore, it should be understood that a key durability component of the present cage assembly 20A is that the outside frame member (e.g., floor supports S1-S4, and vertical struts 32/corner struts 34, including the base portion 31 (FIG. 4)) are all mechanically fastened (e.g., bolts/screws and nuts and/or rivets, etc.) together but they are not welded together. Thus, these components, along with the base 31 and the top or cage roof 33 (FIGS. 1-2) are mechanically fastened, not welded, to form this outer frame member. Among other things, the fastened components allow for expansion and contraction.

As shown in FIGS. 7-9B, the side wall panel 24, internal wall panel 24A, the rear wall panel 26, and the door panel 28 are formed (e.g., via injection molding) of a suitable durable polymer e.g., plastic such as poly-carbonate, polymethyl methacrylate, polyesters, polyolefins (e.g., polypropylene and polyethylene), polystyrene, or the like. The suitable durable polymer should be both light weight and durable to facilitate the transport and reuse of the improved poultry cage 20.

FIG. 7 illustrates a side wall panel 24. The side wall panel 24 panel is perforated with a plurality of generally rectangular windows 50 or air vents. The narrow panel between the windows 50 incorporates a perpendicular rib on the back side of the side wall panel 24 to improve the structural integrity of the side wall panel 24. The rib helps prevent bowing of the side wall panel 24 under stress. In exemplary embodiments, the side wall panel 24 may be molded of a high impact polymer such as polypropylene, polycarbonate, ABS, or the like. Similarly to the side wall panels 24, on the inside of the cages, interior wall panels 24A define the containment area for inner portions of the poultry cage 20A.

An exemplary side wall panel 24 contains a tongue or protrusion T disposed on the edges of the side wall panel 24. The tongue T is designed to match or fit with the groove profile of the aluminum components (e.g., floor supports S1-S4), including vertical struts 32/corner struts 34 and floor panel 12. In addition, pegs TS located on the bottom edge of the side wall panel 24 are received in corresponding grooves GS (see FIGS. 1-2) in the floor layer 22.

Figure 8:
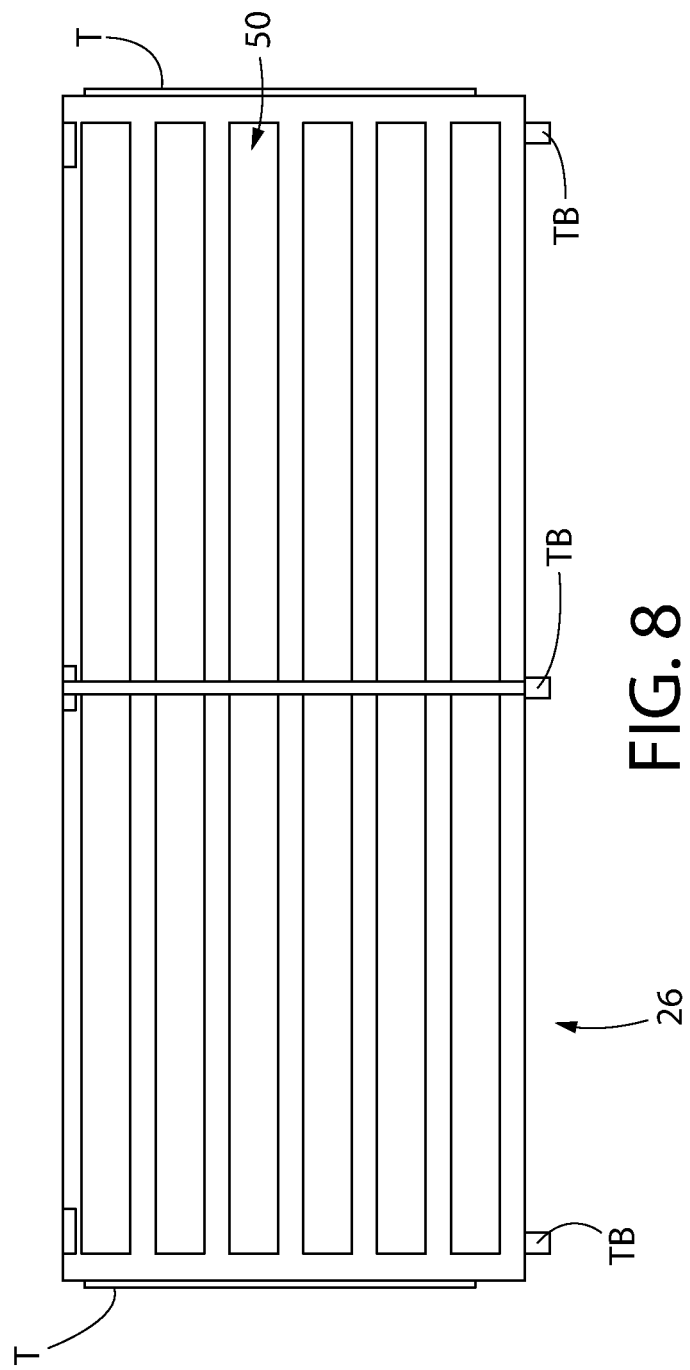
FIG. 8 is a plan view of a back panel for a compartment of the poultry cage.

FIG. 8 also illustrates the rear wall panel 26, which is similar in configuration to the side wall panel 24. The rear wall panel 26 includes a similar window 50 configuration, and protrusions as the side wall panel 24, as shown in FIG. 7. Accordingly, the window configurations allow proper airflow to prevent possible death during hauling activities. These windows also allow for easy application of a tarp during the winter season. The rear wall panel 26 may be molded of a high impact polymer such as polypropylene, polycarbonate, ABS, or the like.

The rear wall panel 26 has flat planer edges on the vertical extremities, which provide a tongue T for the groove receiver of the vertical aluminum frame members (e.g., floor supports S1-S4, and vertical struts 32/corner struts 34). The rear wall panel 26 (and other wall panel components) when assembled to the floor panel 12 and frame members (e.g., floor supports S1-S4, and vertical struts 32/corner struts 34) are secured into place with mechanical fasteners, such a staples, screws, rivets, or adhesive, and/or plugs. In addition, pegs TB located on the bottom edge of the back wall panel 26 are received in corresponding grooves GB (see FIGS. 1-2) in the floor layer 22.

It should be further understood that longitudinal and traverse reinforcing ribs of two depths may be used in the floor panel 22. The shallow ribs provide uniform strength and the deeper ribs provide perimeter strength and interlock compartments to the pallet structure. The poultry cages 20A are interlocked to each other in a stack by interlocking the deep floor ribs inside the adjacent poultry cages 20A.

Figure 9B:
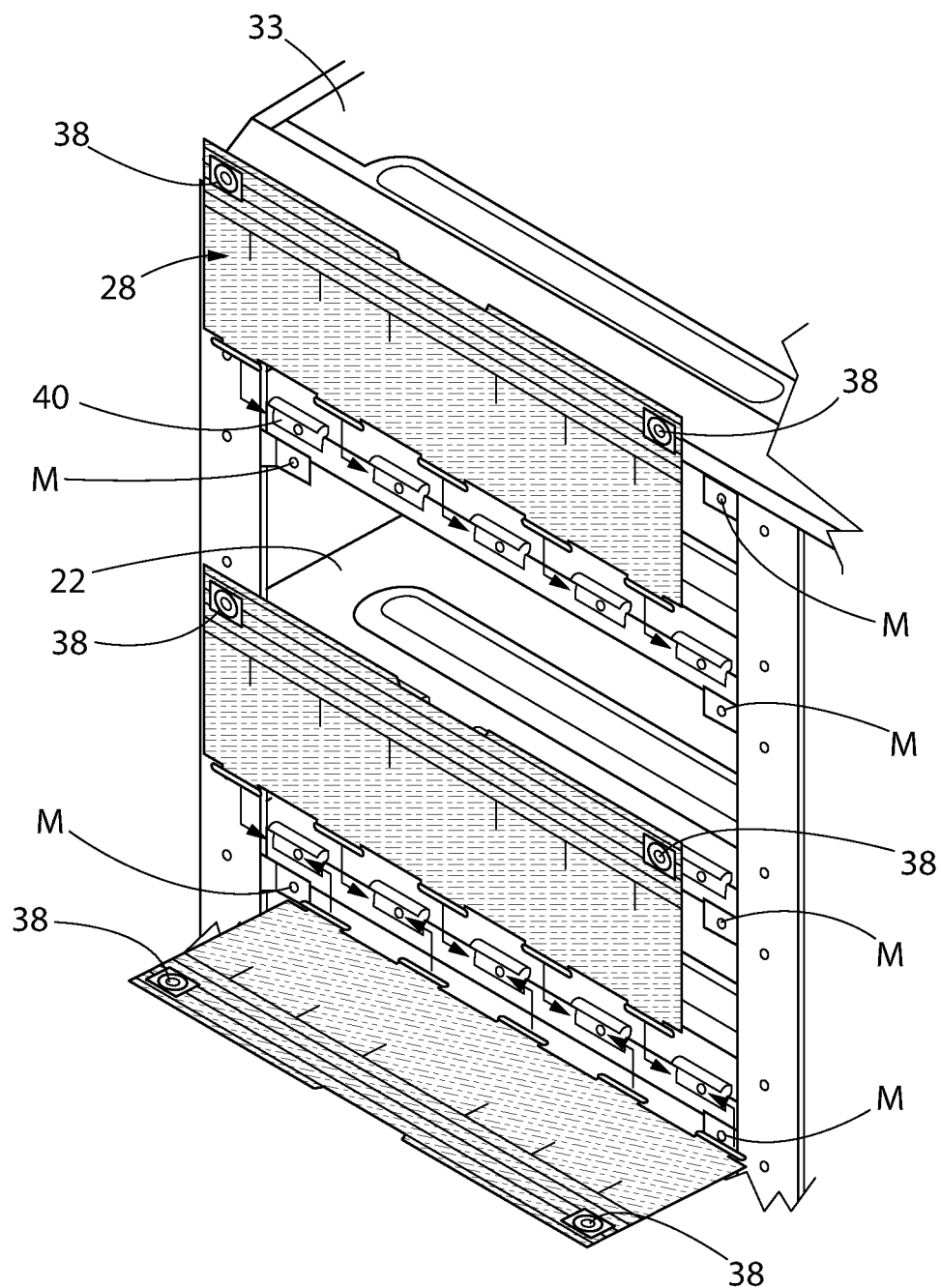
FIG. 9B is a partial isometric view of the front side of the poultry cage showing how three compartment doors are installed for their respective compartments.

FIG. 9B illustrates the door 28, which includes a magnetically attractive plate (also referred to as "strikeplate") 38 that is disposed on the upper extremities of the door 28. The door 28 also includes a metal hinge 40, such as, for example and not limitation, a piano hinge, that is disposed on the lower longitudinal plane of the door 28 and is also affixed to the floor panel 22 by mechanical fasteners. The hinge 40 is mounted to the door 28 and the floor panel 28 in a manner that the hinge knuckle is on the underside to prevent obstructing the removal of poultry when the cage assembly 20A is tilted. The mechanical fasteners used to secure the hinge 40 are designed to break-a-way under stress to prevent damage to the door 28 or the floor panel 22. The door 28 includes a series of longitudinal ribs at the top extremity that increases the structural integrity of the door 28 and reduces bowing of the door 28 under stress. The upper corners of the door include magnetically attractive plates 38 that are designed to align with the magnets M when the door 28 is in a closed position. The attractive force between the magnetically attractive plate 38 and the magnets M is designed to be overcome by the weight of a plurality of birds pressing against the door 28 when the cage 20A is in a tilted position (e.g., during dumping). Therefore, doors 28 are injection molded from high density polyethylene plastic with metal striker plates for the magnets to catch. Furthermore, the doors 28 are hinged by a bulb or tongue inside an extruded aluminum slot bolted to the floor 22 allowing for easy replacement.

For the polymer doors 28, they may be rotationally mounted to the aluminum cage frame with steel pins extending from a tubular profile incorporated in the door panel 28. The pins are designed to extend beyond the door a sufficient amount to protrude into the slightly larger holes in the vertical frame support (e.g., vertical struts 32 and corner struts 34) located on each horizontal extremity of the door 28. For the polymer door 28, the bottom of the door 28 has downward tabs with a hollow core (see FIG. 9A) through which the steel pin or bayonet is used to attach the door 28 with the aluminum floor 22 for the containment area, where the floor has upwards tabs with a hollow core through which the pin is also fastened (see FIG. 9B).

In use, a lot of doors are torn off during normal wear & tear of poultry cages. For conventional cages, the doors are reasonably expensive to replace, since conventional doors are made out of aluminum. Therefore, an advantage of the door assembly 28 of embodiments of the present disclosure is that, since polymer doors are generally less expensive to manufacture, the doors 28 are less expensive to replace.

It should be understood that it is within the broadest scope of the present invention that the positioning of the magnets M and the strikeplates 38 can be reversed, namely, the magnets M could be located on the doors and the strikeplates 38 could be located on the arms A of the floor supports. It should also be understood that the magnetic coupling of the compartment door closure is by way of example only. There are many other means for maintaining the doors in a closed condition during transport, such as spring mechanisms, and that it is within the broadest scope of the present invention to include such other closure mechanisms.

Thus, the aluminum floor panels 22, the polymer side wall panels 24 and internal wall panels 24A, the polymer rear wall panels 26, and the aluminum frame components are affixed to one another using a tongue and groove connection system. Furthermore, as mentioned previously, containment panels are made of injected molded plastic to reduce weight and are held in place by a locking bulb mechanism on each end of the panel and a molded locking bayonet on the bottom. For example, outer edges of the polymer components may include tongues (e.g., a rounded area or bulb) which mate with grooves or a slot of the floor spacer S1, S2, S3 or S4 of the frame or other support members formed as extruded aluminum and allow for the polymer components to be positioned securely.

As mentioned earlier with respect to FIG. 4, the aluminum and polymer constructed cage 20A of the present disclosure utilizes two forklift sleeves 29 to form a rectangular base 31 for the cage 20A. For example, cages 20A may be built on heavy gage aluminum fork tubes to facilitate the cage being moved with a forklift. As mentioned previously, the outer frame is constructed of vertical struts 32 and corner struts 34 that may comprise square tubular posts, which are bolted to each side of the base 31 to segment the frame into compartment stacks. The floor supports are then aligned with the vertical struts 32 or corner struts 34 to provide support for the compartment floors. A single sheet of aluminum 22 is positioned on the floor supports at a common elevation, which provides flooring for the compartments on each level. The cage roof 33 (FIGS. 1-2) is constructed from a single panel of galvanized sheet metal bolted or fastened to the square tubing frame located around the perimeter of the top of the compartments. In exemplary embodiments, the mechanical fastener or bolt may be a metal rivet, a stainless steel bolt, a staple, or the like.

It is advantageously noted that the use of such metal fasteners (as opposed to welding) maintains the strength or integrity of the aluminum frame. Additionally, the aluminum support structures are also formed of extruded aluminum which also does not require welding. Therefore, an exemplary cage 20A is made structurally strong by using extruded aluminum pieces bolted together. Accordingly, by use of fasteners, individual pieces can be individually replaced and repair, whereas a welded cage may have to be discarded as a whole. For example, the poultry cage 20A can be unbolted or unfastened to access and replace a damaged part and then reassembled. Further, the lightweight nature of aluminum and polymer materials used in construction of the poultry cage 20A substantially reduces the weight and cost of the cage in comparison to conventional methods.

Figure 13:
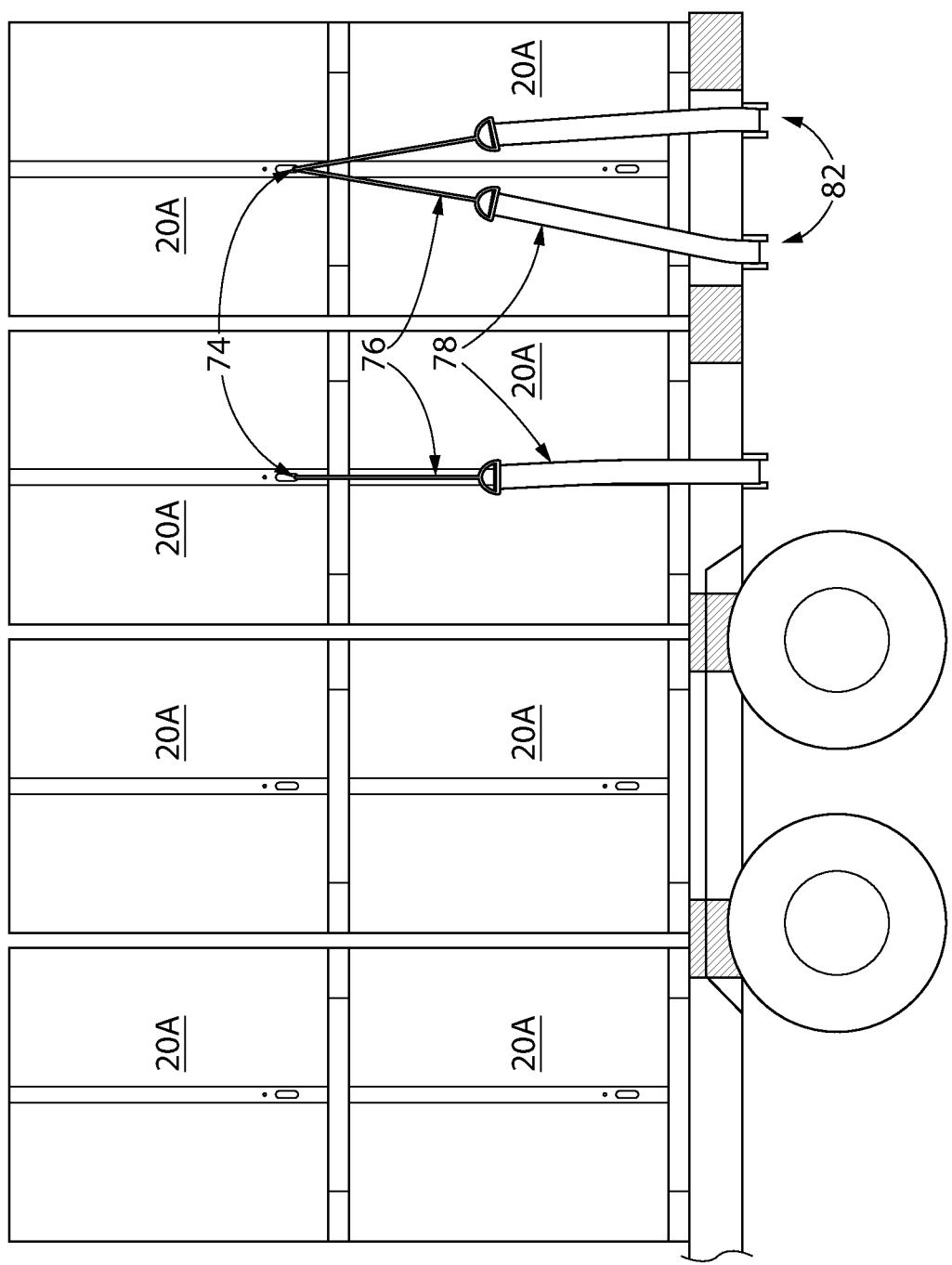
FIG. 13 is a diagram illustrating a less preferred winch system of a cage stack when positioned on the transport trailer in accordance with an exemplary embodiment of the present disclosure.
Figure 16:
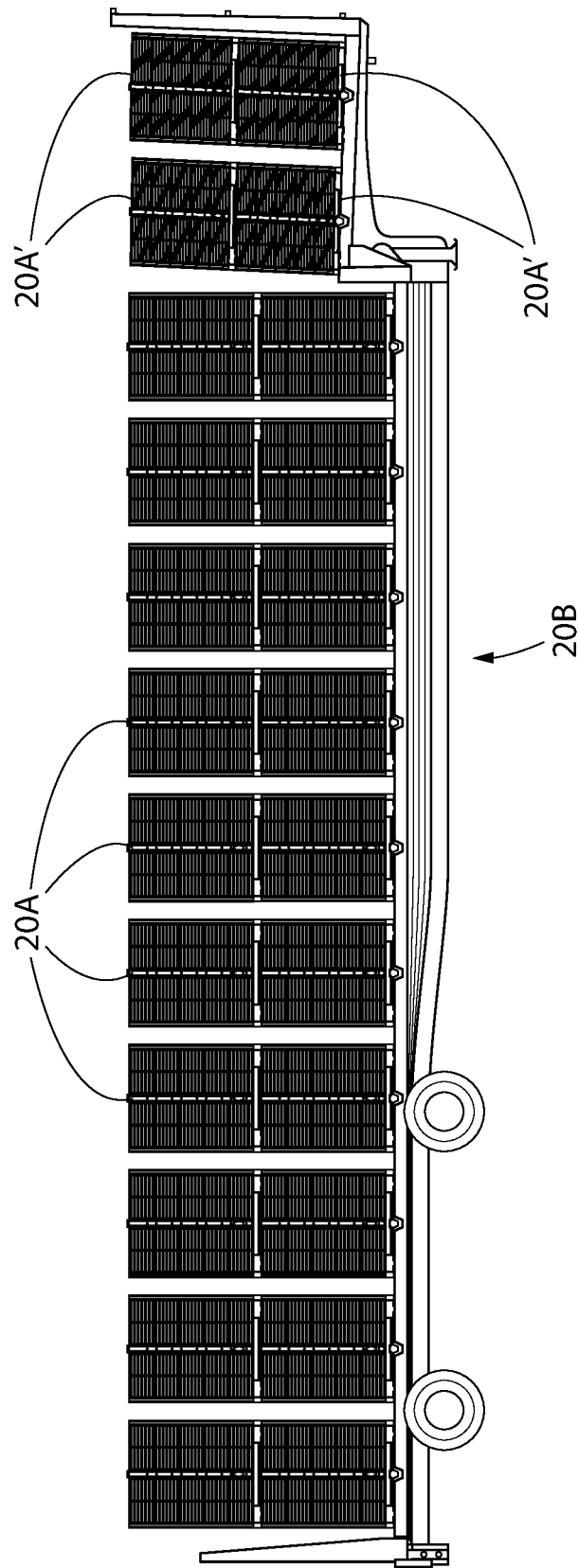
FIG. 16 is a photograph of an embodiment of an improved poultry cage assembly and trailer setup with 24 poultry cages loaded on the trailer.

As shown in FIGS. 13 and 16, the assembled improved poultry cages 20A may be stacked on top of each other to a desired height (e.g., two poultry cages 20A stacked on top of each other). The stack of improved poultry cages 20A can be positioned to fill the reduced weight trailer 20B to the desired number of layers.

Figure 14:
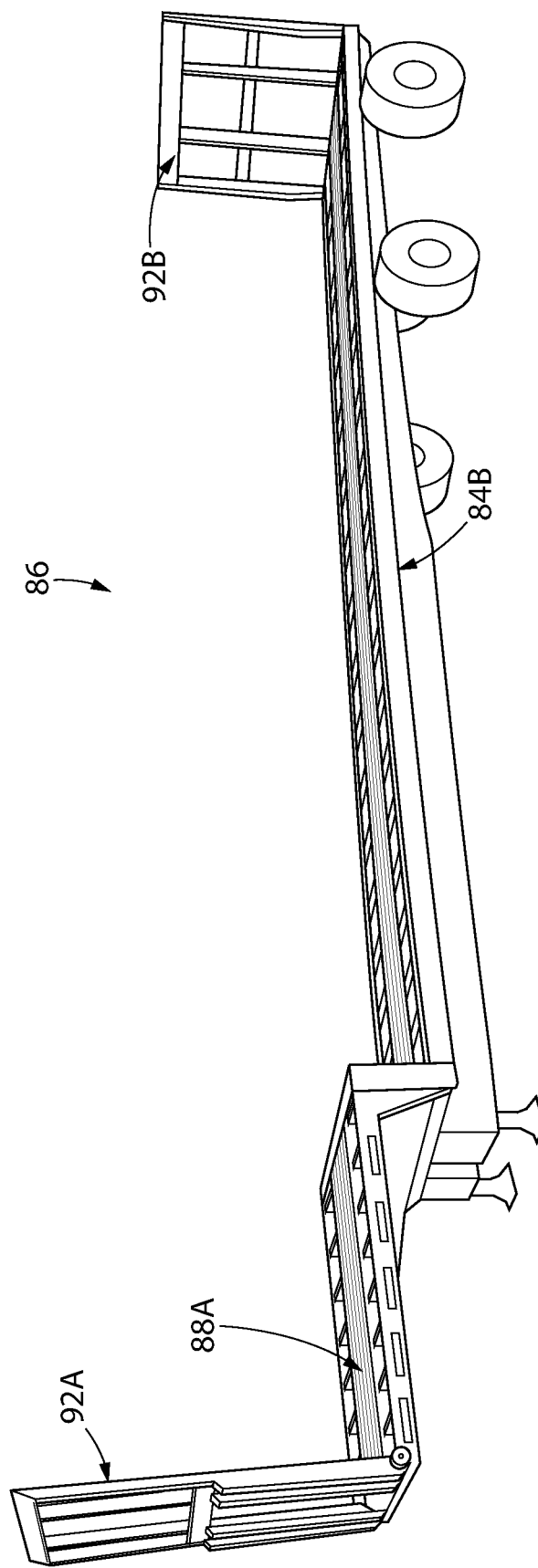
FIG. 14 is a side view of a lightweight trailer in accordance with the present disclosure.

Turning now to FIGS. 1 and 13-14, a binding system used to arrest movement of the poultry cages 20A is illustrated. The outer face of the fork sleeve channel incorporates a circular or oral orifice 74 that may be located in the channel's mid-point (FIG. 13) or alternatively, the orifice 74 may be located on a center-vertical-side support member or post (FIG. 1), which receives a metal rod binder hook 76 which is attached to a cloth belt 78 with a metal bracket fastened to the hook's "D" handle. The device is used to secure the cage stack to the transport trailer with a belt winch mounted to the underside of the transport trailer's outer longitudinal frame. The end stack of cages located on the rear extremity of the transport trailer is secured with two binder devices and belt winches 82 spaced to provide securing force at opposing angles to each other.

Removing the cages from the trailer deck requires relieving the tension on the trailer mounted belt winch 82 a sufficient amount to un-hook the metal rod hook 76 from the upper cage stretcher orifice. As no spring is incorporated, reliving the belt tension is safe to the operator and the tension in a truck roll-over is secured by the tinsel strength of the belt and winch mounting rather than the compressive strength of an incorporated spring as is the case in the conventional binding device.

Reduced Weight Trailer 20B

To achieve the required weight reduction to make an integrated transport system viable, a significant amount of weight must be eliminated in the conventional light-weight aluminum trailer, which maximizes cubic feet availability.

Accordingly, disclosed herein is a trailer structure that accomplishes this goal. To accomplish the economic goals of the transport system the trailer must accommodate twenty-four cages light weight cages with a foot print four feet by eight feet and not exceed the legal length mandated by the states where the transport system is used. In particular, in order to optimize the trailer construction such that the payload (i.e., live bird pounds) is maximized while trailer weight is minimized, the trailer structure maximizes cubic feet available by, among other things, riding low as safely as possible, while reducing weight wherever possible (e.g., using aluminum, using a partial floor, etc.) yet supporting the cages 20A in a secure manner (e.g., via the use of guides on the trailer edges that interlock with the edges of the cages 20A).

Figure 15A:
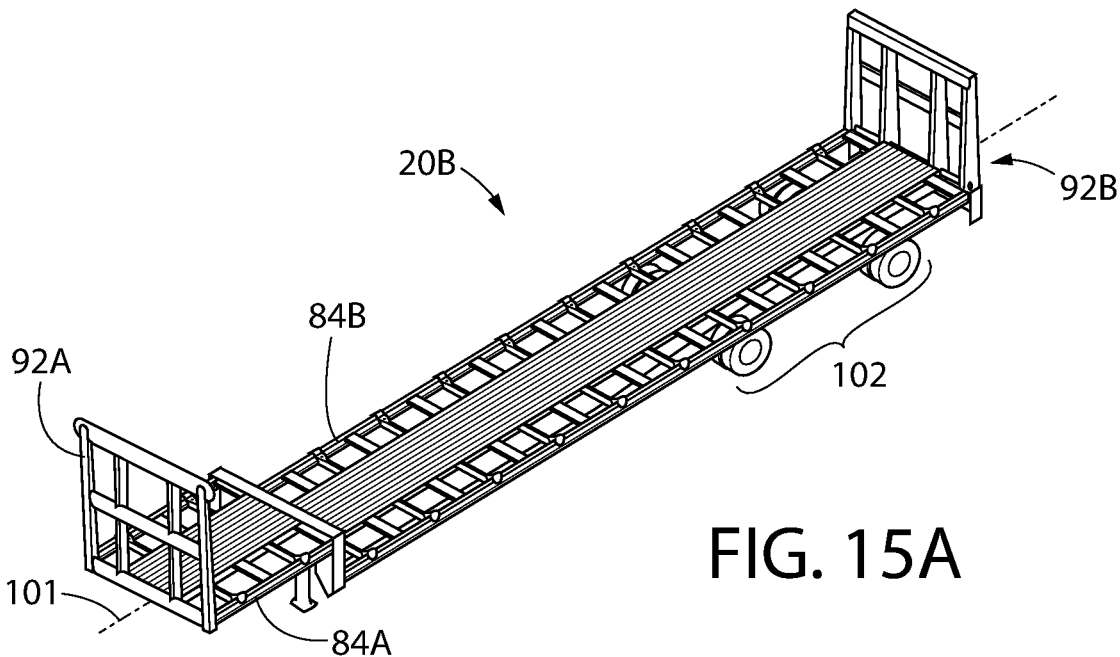
FIG. 15A is an isometric view of the lightweight trailer in accordance with the present invention.
Figure 15B:
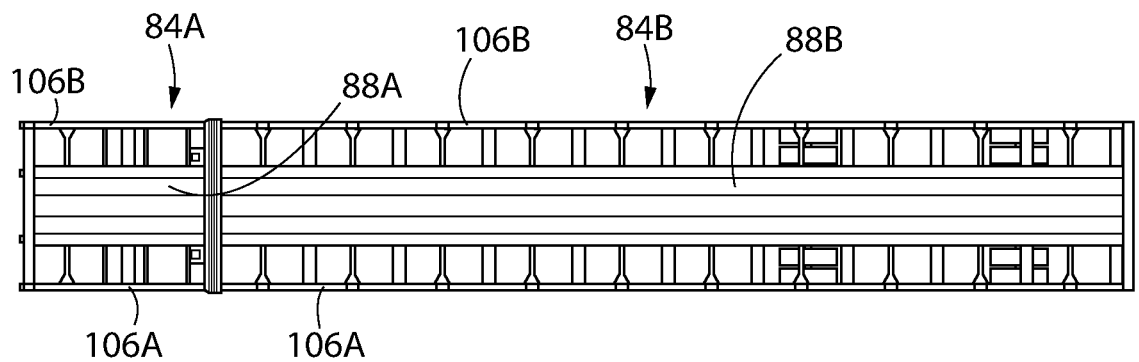
FIG. 15B is a plan view of the lightweight trailer in accordance with the present invention.
Figure 15C:
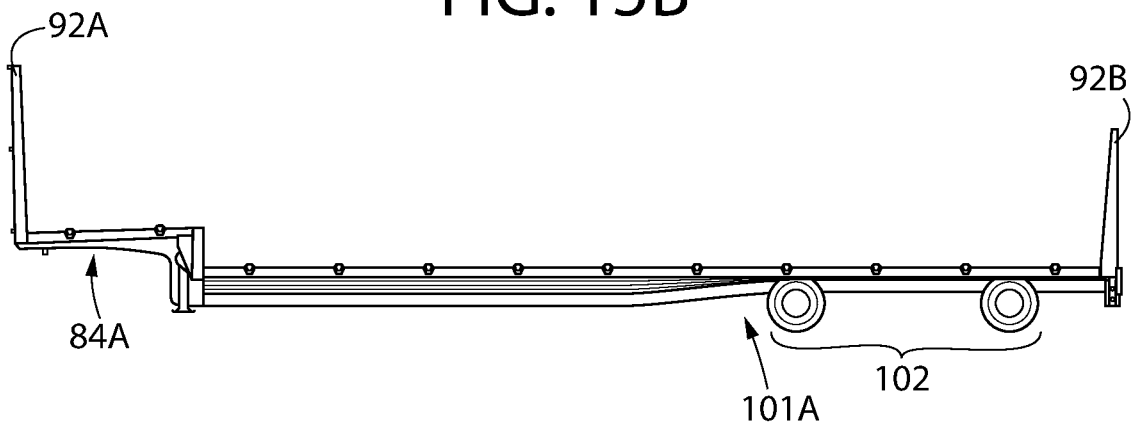
FIG. 15C is a side view of the lightweight trailer in accordance with the present invention.
Figure 16E:
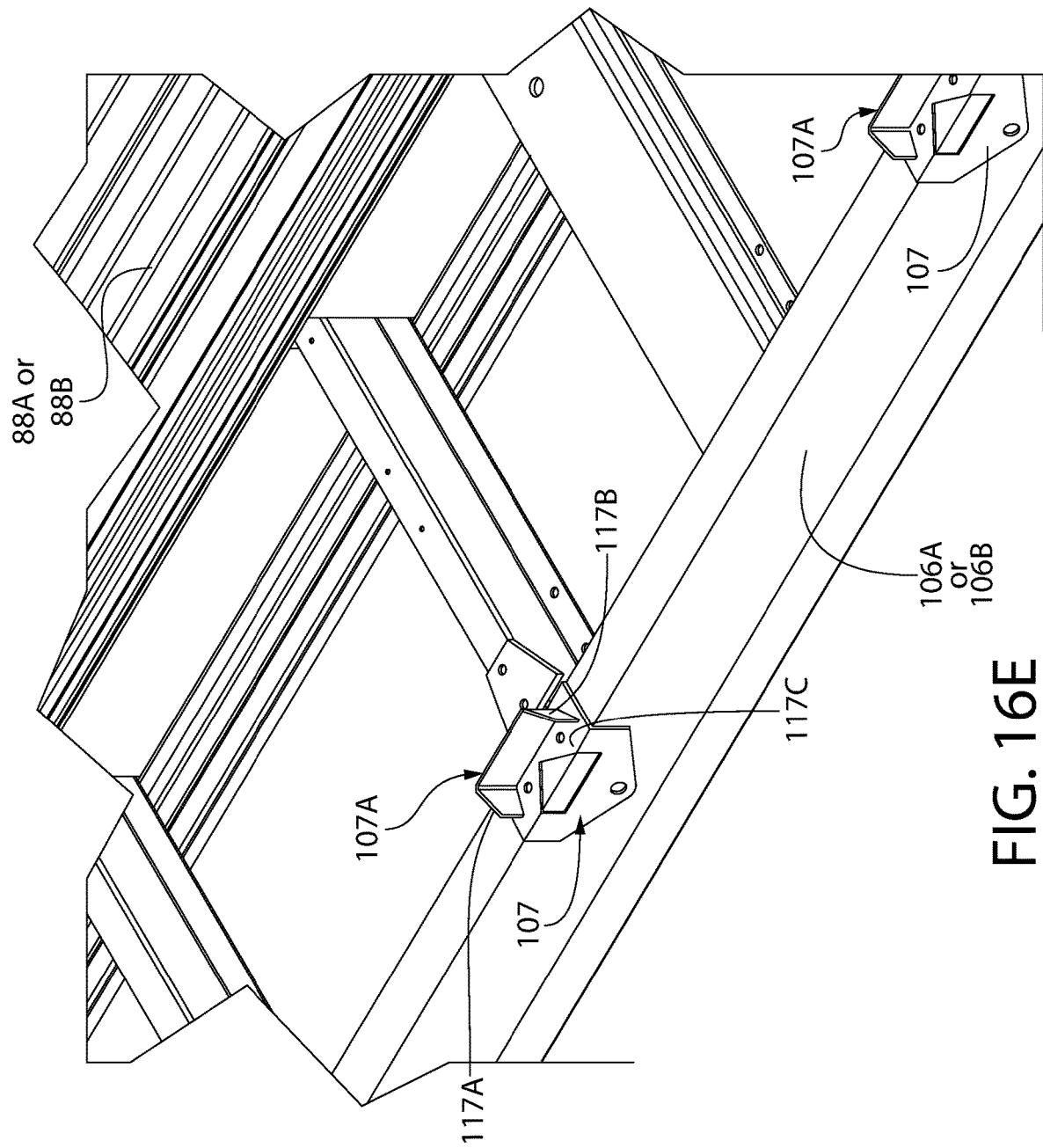
FIG. 16E is an enlarged view showing a cage alignment stop mounted on a guide rail of the trailer.
Figure 16F:
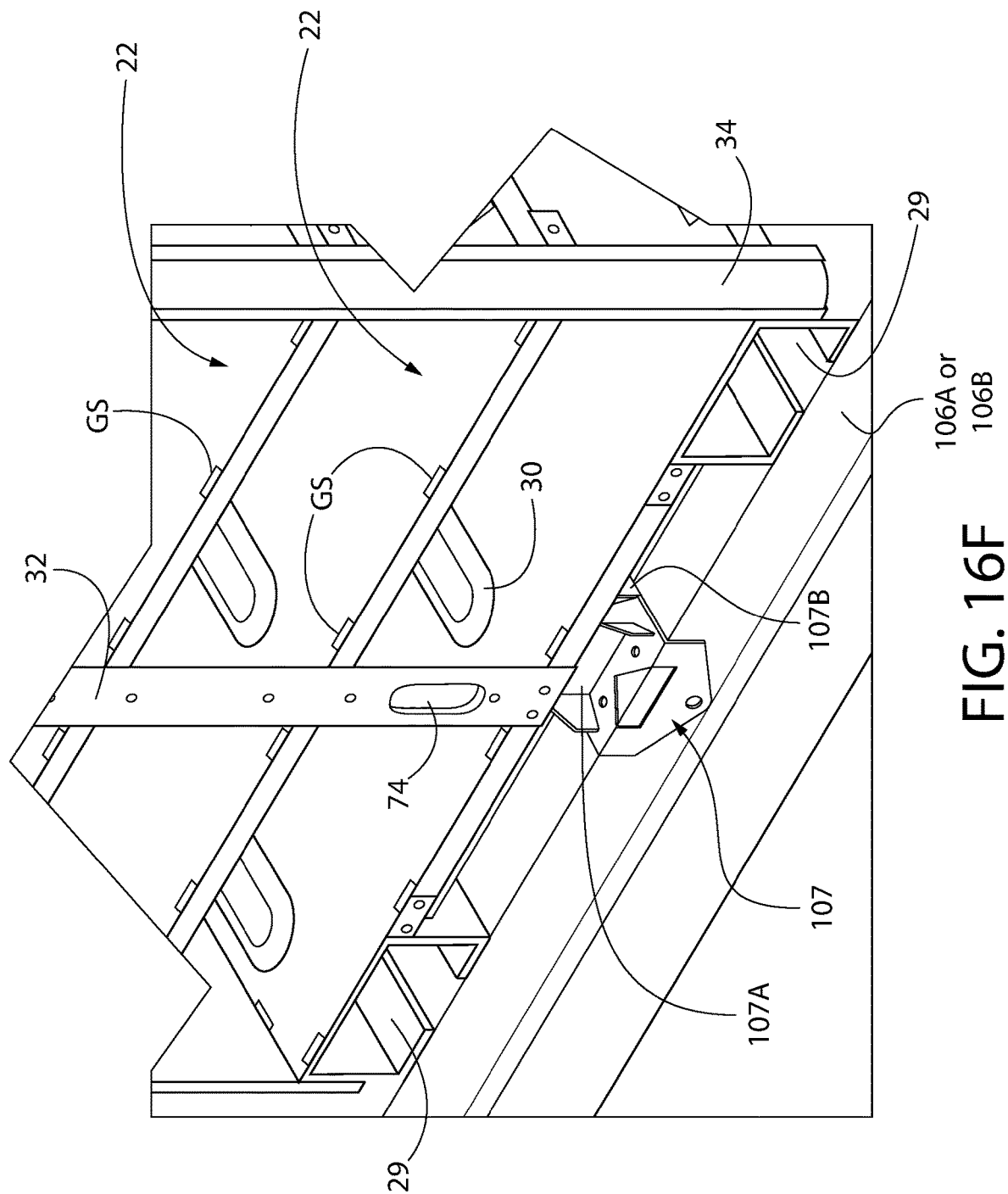
FIG. 16F is similar to the view of FIG. 16E but showing a cage (also shown with no side wall panels installed) on the trailer with the cage alignment stop engaged with the corresponding cage member.
Figure 16G:
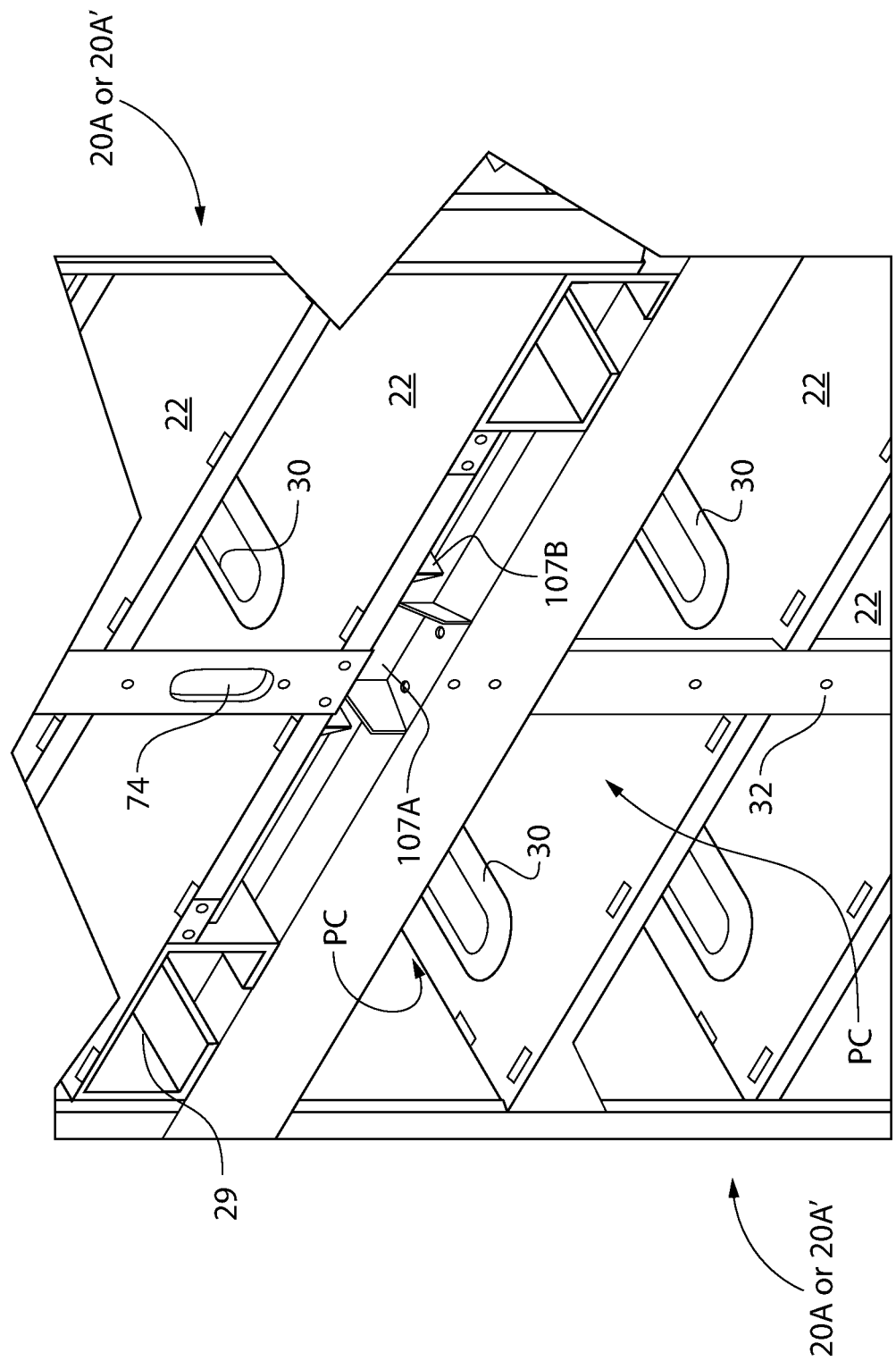
FIG. 16G is an enlarged view showing how cages (also shown with no side wall panels installed), when stacked, also utilize their corresponding cage alignment stop members relative to one another.
Figure 16H:
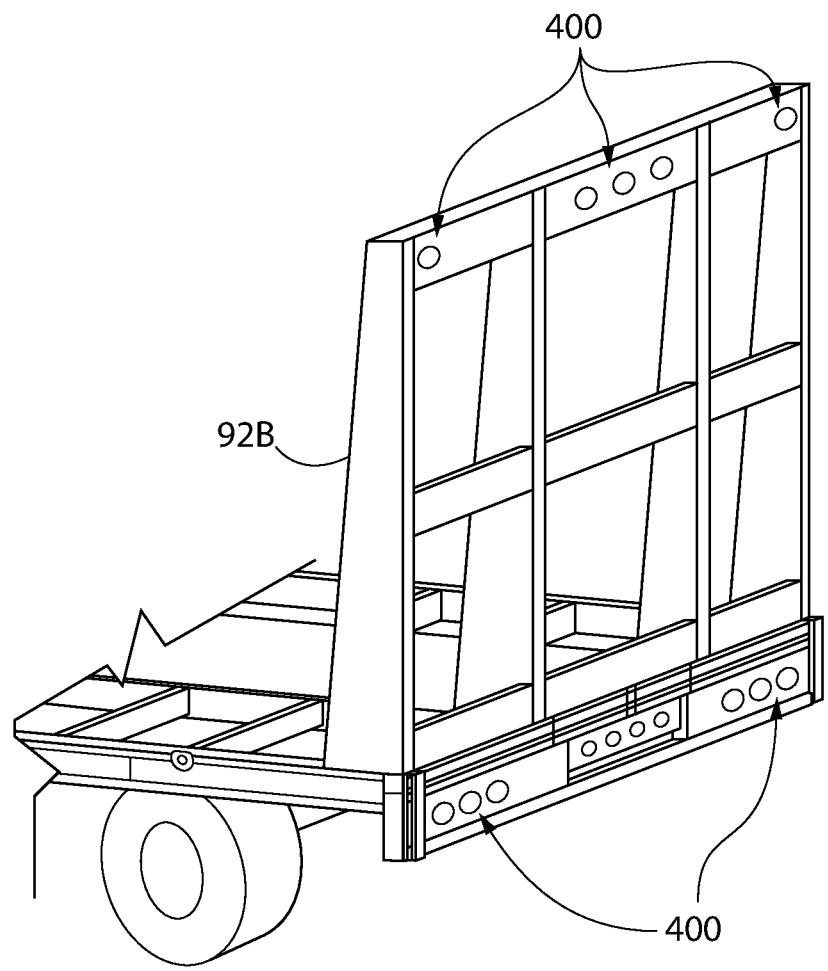
FIG. 16H is a partial isometric view of the safety frame located at the tail end of the trailer and using supplemental visual indicators for added safety.

Turning now to FIGS. 15-16H, a frame structure 84A/84B of a light-weight trailer 20B in accordance with exemplary embodiments of the disclosure is illustrated. The weight reduction of the trailer is accomplished by constructing a frame structure 84A/84B that is configured expressly for supporting the pallets of the cage stacks and removing the unnecessary remaining deck structure. The frame structure 84A/84B is designed to support an evenly loaded trailer rather than a conventional trailer designed for worst case support of a large maximum weight located in a central location of the trailer deck. In one embodiment, as shown in FIG. 15, the back wheels (and axles) of the trailer may be spaced apart to meet applicable bridge laws and regulations.

In particular, as shown most clearly in FIGS. 15A-15D, the trailer 20B forms a drop deck configuration comprising an upper deck 84A and a lower deck 84B. The lower deck 84B which comprises the majority of trailer 86 is formed of two aluminum main beams 100A/100B (FIG. 15D) that are oriented longitudinally along the axis 101 of the trailer. The lower deck 84B is secured to the aluminum main beams 100A/100B. To reduce weight without compromising strength, the floor portions 88A and 88B of the upper deck 84A and the lower deck 84B, respectively, comprise a narrow centralized region. Since the edges of the cages 20A rest upon the guides 106A/106B on the sides of the trailer bed structure, it was determined that the flooring outward from a middle flatbed region to the sides of the trailer 86 could be removed and that by omitting such flooring, the weight of the trailer 86 could be reduced. As a result, the narrowed floor portions 88A/88B allow for trailer weight reduction while at the same time providing sufficient resistance to racking or twisting of the trailer 86 during use. The floor portions 88A/88B may comprise a plurality of extruded aluminum members that are bolted together along the axis 101 of the trailer bed. Another advantage of the minimized flooring is that it permits chicken litter, that is pulled onto the trailer 20B while loading, to escape and not build up on the floor of the trailer 20B which would occur it were a complete floor.

A suspension assembly or bogie 102 mounts the tail end of the trailer 20B to the back wheel assembly while landing gear 104A/104B supports the front end of the trailer 20B when it is not coupled to the tractor's fifth wheel. The suspension assembly 102 may comprise "sliders" (not shown) that permit the separation between axles in the suspension assembly to be adjustable in order to meet the bridge laws of various jurisdictions in the U.S.

As with the use of aluminum in the cages 20A, use of aluminum for the trailer 20B provides for a stable yet light-weight structure. Also, the aluminum material is able to better withstand the deteriorating effects of fecal matter from the poultry.

Proper loading of the poultry cages 20A on the light-weight trailer 20B prevents cage stacks being inadequately supported and/or exceeding the legal length of the trailer 20B. In one embodiment, the trailer is equipped with transverse and longitudinal deck beams and longitudinal center floor strip 88 for added support above the beams for poultry cage loads.

In exemplary embodiments, the poultry cage transportation assembly including the stack of improved poultry cages 20A provides a reduced poultry cage weight which permits greater payload and fuel economy (thereby also reducing carbon emissions) for transportation of poultry. Furthermore, the improved poultry cages 20A provide additional savings by breaking down for transport when not used to transport live poultry.

Consider that a conventional poultry cage assembly generally weighs between 900-950 lbs. If a typical trailer is able to haul 22 of these cages; a trailer typically weighs between 13,000-14,000 lbs.; and the tractor also typically weighs 14,000 lbs., then, the empty weight of a truck and trailer loaded with 22 cages is (22×900)+(14,000)+(14,000)=47,800 lbs.

Assuming the maximum load allowed for the truck/trailer is 80,000 lbs., the weight of the maximum load of poultry will be 32,200 lbs., for the conventional poultry cage assembly and trailer setup.

In contrast, the improved poultry cage assembly of the present invention may comprise a four-shelf light-weight cage and a five-shelf light-weight cage, each of them weighing 411 lbs. and 480 lbs., respectively. In addition, the improved light-weight trailer of the present invention weighs empty at 8260 lbs. Since the upper deck 84A accommodates four of the four-shelf cages 20A and the lower deck 84B accommodates twenty of the five-shelf cages 20A, then the empty weight of a truck, 24 light-weight cages and the light-weight trailer is ([4×411]+[20×480])+14,000+8260=33,504 lbs.

Again, assuming the maximum load allowed for the truck/trailer is 80,000 lbs., the weight of the maximum load of poultry will be 46,496 lbs. (i.e., 80,000 lbs.−33,504 lbs.), for the improved poultry cage assembly and trailer combination of the present invention, which is a substantial improvement, while also carrying an additional two poultry cages (24 [present invention]−22 [conventional poultry hauling trailer]=2). Such improvements to a poultry cage assembly and trailer design, in accordance with the present disclosure, may reduce the weight of conventional hauling cages by 50% allowing for a larger payload per trailer (without exceeding legal weight limits), thus reducing the number of loads required. Further, such improvements may allow for increased payloads, thus reducing the amount of required trips, thereby saving fuel and man hours.

Referring next to FIG. 16-16H, an embodiment of the improved poultry cage assembly and trailer setup is shown with 24 cages loaded. It is noted that the cage assemblies on the drop deck of the trailer contain five shelves or containment levels per cage 20A, whereas the cage assemblies 20A' on the up deck 84A of the trailer contain four shelves or containment levels per cage. In this way, a maximum height may be maintained across the load of the trailer 20B. Thus, it should be understood that cage assemblies 20A' are formed in the same way as cage assemblies 20A but only four shelves, rather than five shelves, are present. As a result, all of the features of cage 20A are present in cage 20A' except that the cage 20A' only comprises four shelves.

In particular, FIGS. 16A-16D show different views of one stack of two cages 20A placed on the trailer 20B. To locate each cage 20A that is placed on the trailer guide rails 106A/106B, a plurality of cage alignment stops 107 are evenly positioned along each guide rail 106A/106B, as can be seen clearly in FIGS. 16A-16C. Each cage alignment stop 107 comprises an upwardly-extending base member 107A having upwardly-extending angled wing members 117A and 117B all forming an upwardly-extending flange on an L-shaped plate 117C which is secured to either guard rail 106A or 106B (see FIG. 16E) and wherein the cage alignment stop 107 thus forms an upwardly-extending, outwardly-opened flange. When a cage 20A is placed upon the trailer 20B (see FIG. 16F), the cage 20A is positioned such that a corresponding downwardly-extending, outwardly-opened flange 107B (comprising a downwardly-extending base member with downwardly-extending angled wing members (not shown)) on the edge of the cage 20A receives the cage alignment stop 107 therein, as shown most clearly in FIG. 16F. It should be noted that each cage 20A comprises the downwardly-extending, outwardly-opened flange 107B on its two opposite short sides under its bottom edge, between the forklift sleeves, as shown in FIG. 16G. In addition, each cage 20A also comprises the upwardly-extending, outwardly-opened flange 107 on its two opposite short sides on its top surface. As a result of these upwardly-extending, outwardly-opened flanges 107/107B, cages 20A can be stacked and automatically aligned to form an aligned column of cages with proper spacing between the stacks.

Figure 17:
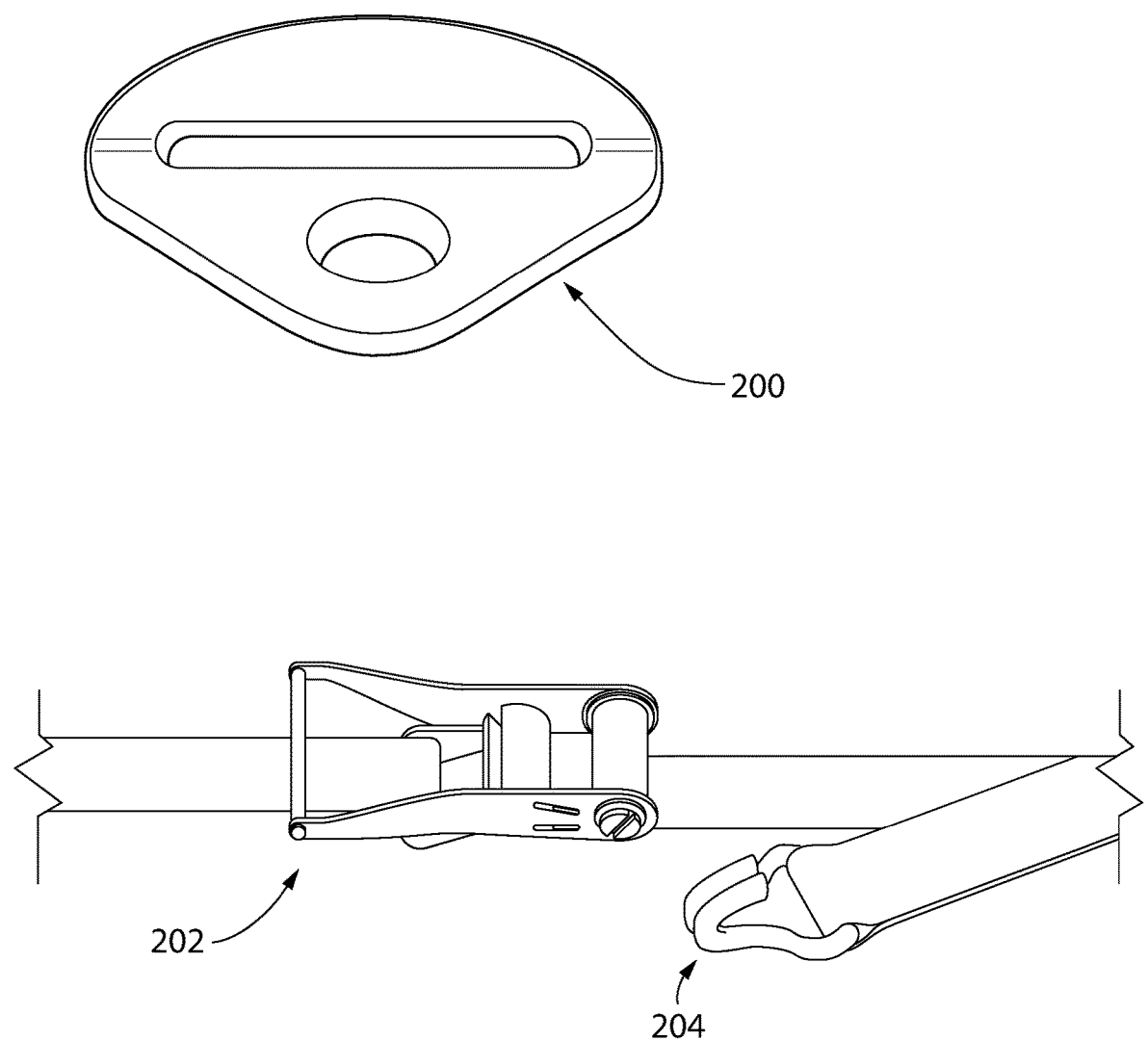
FIG. 17 depicts the components of a preferred ratchet mechanism for use on the present invention cage/trailer system to releasably secure the cage stacks to the trailer.

With the aligned stacked cages placed on the trailer 20B, a ratchet mechanism 202 (FIG. 17) is used to releasably secure the cage stacks to the trailer 20B. This ratchet mechanism 202 is rated for predetermined pounds and is particularly adapted for this specific use. The ratchet mechanism 202 is the preferred cage/trailer releasable coupling mechanism when compared to the alternative and less preferred winch system (discussed previously with regard to FIGS. 12-13). In this preferred configuration, a strap mounting plate 200 is coupled to the side of the trailer at each cage alignment stop 107. A short length (e.g., approximately six inches) of strap is looped through the mounting plate 200 and secured (e.g., sewn) back on itself so that it is permanently attached to the trailer 86 and to the ratchet mechanism 202. A hook 204 is inserted into the slotted holes on the side of the cage 20A, as discussed previously, and ratcheted down, thereby holding the cages 20A to the trailer 86.

During transit, the last stack of two cages on the rear extremity of the light-weight trailer may pose a danger to vehicles and persons following the trailer during transit should the primary binding system fail. Safety frames 92A/92B shown in FIG. 14 are designed to provide a fail-safe mechanism to prevent the cages 20A from sliding off the back of the trailer 20B and to ensure that the cages 20A remain secured to the light-weight trailer 20B. The safety frames 92A/92B are the width of the frame structure 84 and extends sufficiently high to prevent the top cage in the stack from falling, where the safety frames 92A/92B are retained in the perpendicular position. Furthermore, safety frame 92A is provided in the front of the trailer to prevent poultry cages 20A from impacting the trailer cab. In addition, this safety frame 92A at the front of the trailer 86 also serves to form a protective barrier (e.g., via the use of a tarp thereon, etc.) to be used in extreme cold weather to protect the chickens from cold air during transportation. Furthermore, the safety frame 92B located at the end of the trailer 86 permits the incorporation of additional visual indicators 400 that would not normally be available at the back end of a drop deck trailer (see FIG. 16H). This increases safety as it provides for better trailer visibility.

In addition to reduced weight, embodiments of the improved poultry cage 20A and its structure are durable enough to with stand forklift abuse and the weight of the chickens during the transportation from farm to processing plant. For example, the use of bolts and metal fasteners provide sufficient flexibility and durability to withstand the rigors and compensate for contractions & expansions or twists & turns to the poultry cage assembly during routine transit and use (e.g., hauling and dumping). Therefore, the improved poultry cage 20A can replace the steel cages currently used in the poultry industry, and in turn, provide a cage that reduces weight and enhances the ability to haul more chickens per load. Further, embodiments of the poultry cage 20A of the present disclosure fit and comply with present dumping systems used by the broiler industry and are conducive to standard forklift procedures, transit loading and unloading procedures, and processing plant dumping and expulsion procedures.

It should be emphasized that the above-described embodiments are merely possible examples of implementations, merely set forth for a clear understanding of the principles of the disclosure. Many variations and modifications may be made to the above-described embodiment(s) of the present disclosure without departing substantially from the spirit and principles of the disclosure.

Accordingly, dimensional features of the improved poultry cage 20A can be modified to fit current needs. As an example, one variety of the poultry cage 20A contains an approximate 11-inch opening within each containment area. For this, the cage 20A may be equipped to have 5 shelves. In addition, smaller chickens may need to be housed in a cage that does not require an 11-inch opening. Instead, an approximate 9-inch opening is used in an alternative variety of the improved poultry cage 20A. Due to the reduced opening size, the cage 20A may be extended to a 6-shelf height, as an example.

All such modifications and variations are intended to be included herein within the scope of this disclosure.

While the invention has been described in detail and with reference to specific examples thereof, it will be apparent to one skilled in the art that various changes and modifications can be made therein without departing from the spirit and scope thereof.

What is claimed is:

1. A method of forming a reduced weight poultry cage, said method comprising:
    forming an aluminum frame that defines a front, sides, a back, a top and a base of said cage;
    supporting an outer periphery of each one of a plurality of aluminum floor layers within said frame;
    forming a plurality of compartments within said frame on said plurality of floor layers; and
    pivotally-mounting a respective compartment door for each one of said compartments at the front of said cage.

2. The method of claim 1 further comprising the step of forming a first set of alignment members on said base of said cage, on opposite sides of said cage, and forming a second set of alignment members on said top of said cage, on opposite sides of said cage, said first set of alignment members being configured to engage a second set of alignment members of another cage stacked thereon.

3. The method of claim 1 further comprising the step of forming a pair of forklift tine sleeves, one sleeve being located at the front of said cage and the other sleeve being located at the back of said cage, and wherein said pair of sleeves are positioned at a base portion of said cage and which run from one side of said cage to the other side of said cage.

4. The method of claim 1 wherein said step of forming said aluminum frame comprises using fasteners to couple components of said aluminum frame together.

5. The method of claim 1 wherein said step of forming said aluminum frame comprises using a plurality of vertical struts and wherein two of said vertical struts, each located on opposite sides of said cage, have a respective orifice formed therein, said orifice configured for receiving a belt coupling therein for securing said cage to a hauling trailer.

6. A method of conveying live poultry in cages on a trailer and optimized to maximize payload while minimizing cage and trailer weight, said method comprises:
 (a) forming an aluminum frame that defines a front, sides, a back, a top and a base of said cage;
 (b) supporting an outer periphery of each one of a plurality of aluminum floor layers within said frame;
 (c) forming a plurality of compartments within said frame on said plurality of floor layers;
 (d) pivotally-mounting a respective compartment door for each one of said compartments at the front of said cage;
 (e) loading poultry into each one said poultry compartments;
 (f) forming a reduced weight trailer for carrying at least one reduced weight poultry cage by coupling a frame structure, comprising a pair of aluminum guide rails coupled together by a plurality of aluminum cross members, to a plurality of aluminum main beams arranged longitudinally along the length of the trailer;
 (g) coupling a suspension assembly to said main beams located at a rear portion of said trailer for supporting said frame structure and said main beams upon a plurality of wheel axle assemblies; and
 (h) loading said at least one reduced weight poultry cage containing said poultry onto said trailer.

7. The method of claim 6 further comprising the step of forming a first set of alignment members on said base of said cage, on opposite sides of said cage, and forming a second set of alignment members on said top of said cage, on opposite sides of said cage, said first set of alignment members being configured to engage a second set of alignment members of another cage stacked thereon.

8. The method of claim 6 further comprising the step of including a trailer floor only on a middle portion of said frame structure along the length of said trailer.

9. The method of claim 6 further comprising the step of forming a pair of forklift tine sleeves, one sleeve being located at the front of said cage and the other sleeve being located at the back of said cage, and wherein said pair of sleeves are positioned at a base portion of said cage and which run from one side of said cage to the other side of said cage.

10. The method of claim 7 further comprising the step of forming a plurality of cage alignment stops on each aluminum guide rail to form transversely aligned pairs of cage alignment stops and wherein a pair of said transversely aligned cage alignment stops engage a corresponding pair of said first alignment members on said base portion of said cage when said cage is positioned on said trailer.

11. The method of claim 6 wherein said step of forming an aluminum frame comprises using fasteners to couple components of said aluminum frame together.

12. The method of claim 6 wherein said step of forming the aluminum frame comprises using a plurality of vertical struts and wherein two of said vertical struts, each located on opposite sides of said cage, have a respective orifice formed therein, said orifice configured for receiving a belt coupling therein for securing said cage to a hauling trailer.

* * * * *